United States Patent [19]

Yardley

[11] Patent Number: 5,381,915
[45] Date of Patent: Jan. 17, 1995

[54] COLLAPSIBLE, REUSABLE CONTAINER

[75] Inventor: William C. Yardley, Chicago, Ill.

[73] Assignee: Yardley Box Company, Merrionette Park, Ill.

[21] Appl. No.: 48,746

[22] Filed: Apr. 16, 1993

[51] Int. Cl.⁶ .................................................. B65D 6/24
[52] U.S. Cl. ................................... 220/4.33; 220/4.28; 206/600
[58] Field of Search ................ 206/386, 577, 600; 220/1.5, 4.28, 4.33, 4.34

[56] References Cited

U.S. PATENT DOCUMENTS

| | | | |
|---|---|---|---|
| 1,244,234 | 5/1917 | Taber | 220/4.33 |
| 1,932,773 | 10/1933 | Eschenbach | 220/4.33 |
| 2,667,938 | 1/1954 | Claflin | 220/4.28 |
| 2,869,750 | 1/1959 | Doerr et al. | 220/4.33 |
| 3,156,370 | 11/1964 | Monfort | 220/4.33 |
| 3,760,970 | 9/1973 | Lutz | 220/4.28 |
| 3,809,278 | 5/1974 | Csumrik | 220/4.33 |
| 3,877,602 | 4/1975 | Clark et al. | 220/4.33 |
| 3,966,285 | 6/1976 | Porch et al. | 220/4.33 |
| 3,968,895 | 7/1976 | Barnes, Jr. et al. | 206/600 |
| 3,982,650 | 9/1976 | Ichihara | 220/4.28 |
| 4,300,695 | 11/1981 | Hsu | 220/4.34 |
| 4,785,957 | 11/1988 | Beck et al. | 206/600 |
| 4,807,808 | 2/1989 | Reed | 220/4.28 |
| 4,932,545 | 6/1990 | Sweet et al. | 206/600 |
| 5,056,666 | 10/1991 | Janssens | 206/600 |
| 5,123,541 | 6/1992 | Giannini et al. | 206/600 |

FOREIGN PATENT DOCUMENTS

| | | | |
|---|---|---|---|
| 115138 | 5/1942 | Australia | 220/4.33 |
| 2651746 | 3/1991 | France | 206/600 |
| 248098 | 7/1987 | Germany | 206/600 |
| 2258551 | 10/1990 | Japan | 206/600 |
| 1163354 | 9/1969 | United Kingdom | 220/4.34 |

Primary Examiner—David T. Fidei
Attorney, Agent, or Firm—Fitch, Even, Tabin & Flannery

[57] ABSTRACT

A collapsible, reusable container is provided which may be easily and rapidly assembled and disassembled. In its assembled state, side panels are engaged with a base pallet by a pin-and-hole arrangement, with the side panels extending perpendicularly from the base pallet. Securing members prevent the side panels from tilting significantly with respect to the base pallet. Upon disengagement of the securing members, the side panels are tiltable with respect to the base pallet. When tilted sufficiently with respect to the base pallet, the respective side panels are each easily disengageable from the base pallet. The side panels are nestable following their disengagement from the base pallet and may be accommodated within the enclosure formed upon bringing together the lid and base pallet to provide a compact shipping unit.

25 Claims, 9 Drawing Sheets

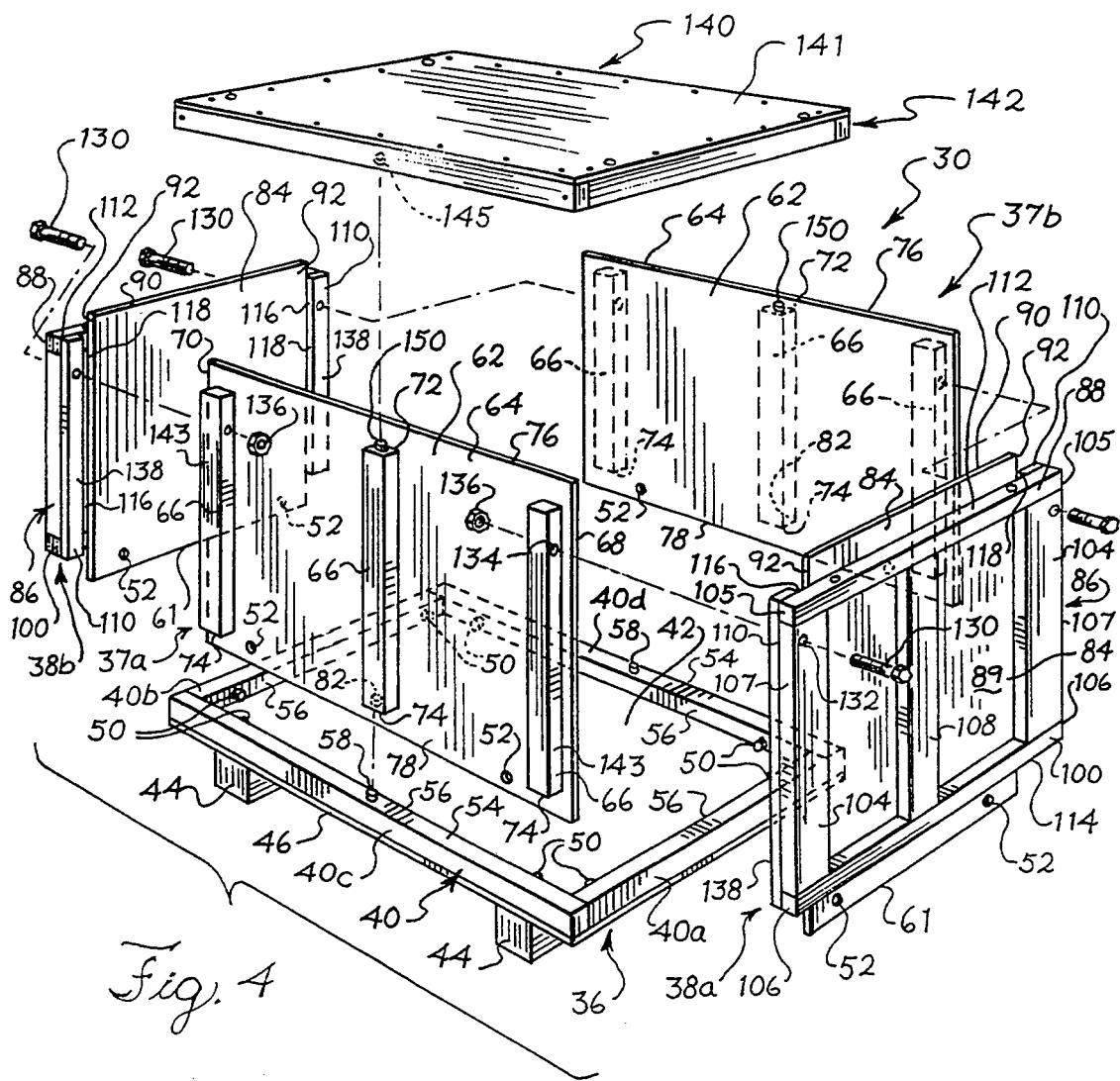

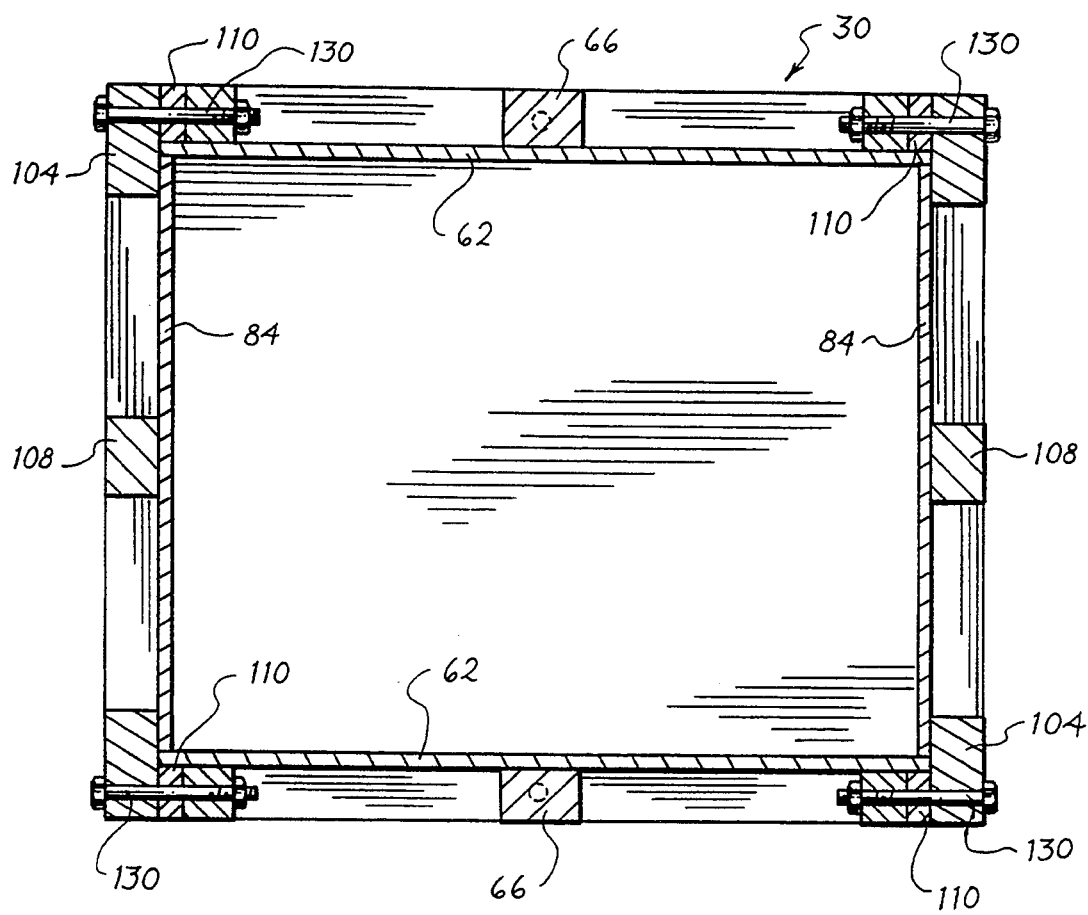
Fig. 7
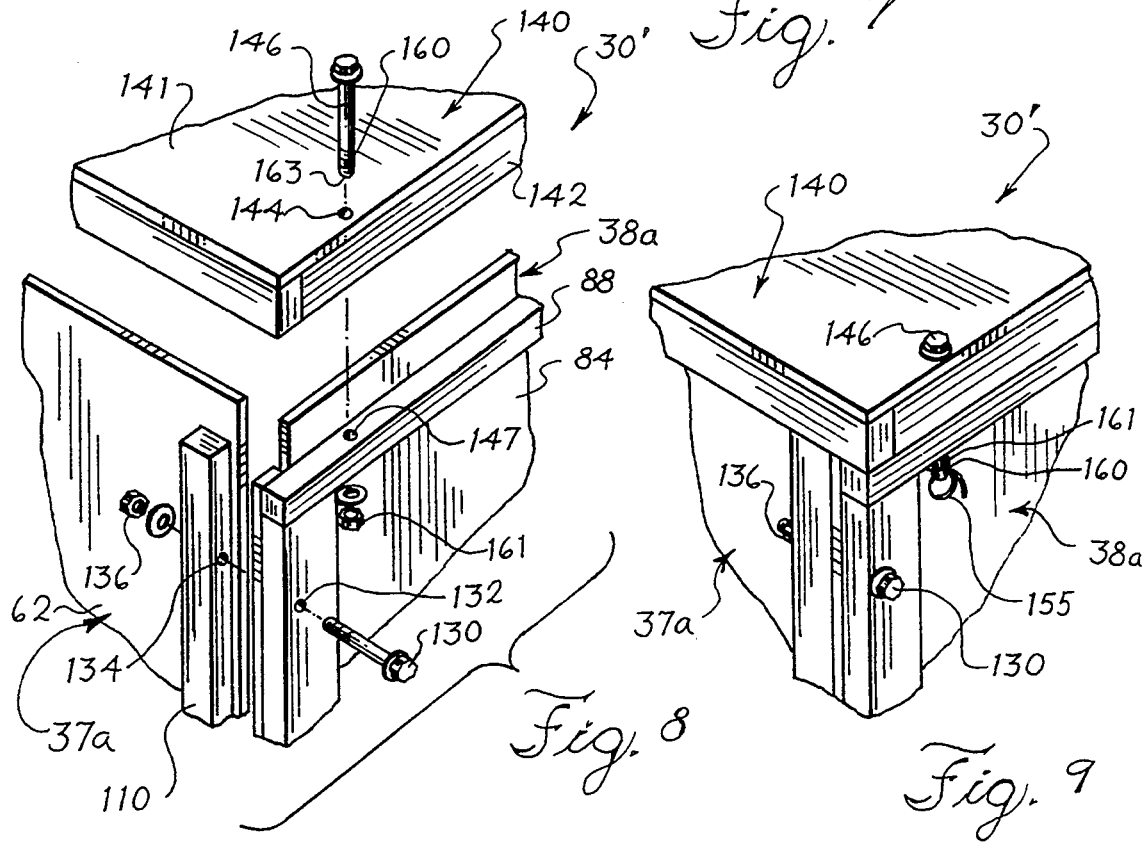
Fig. 8
Fig. 9

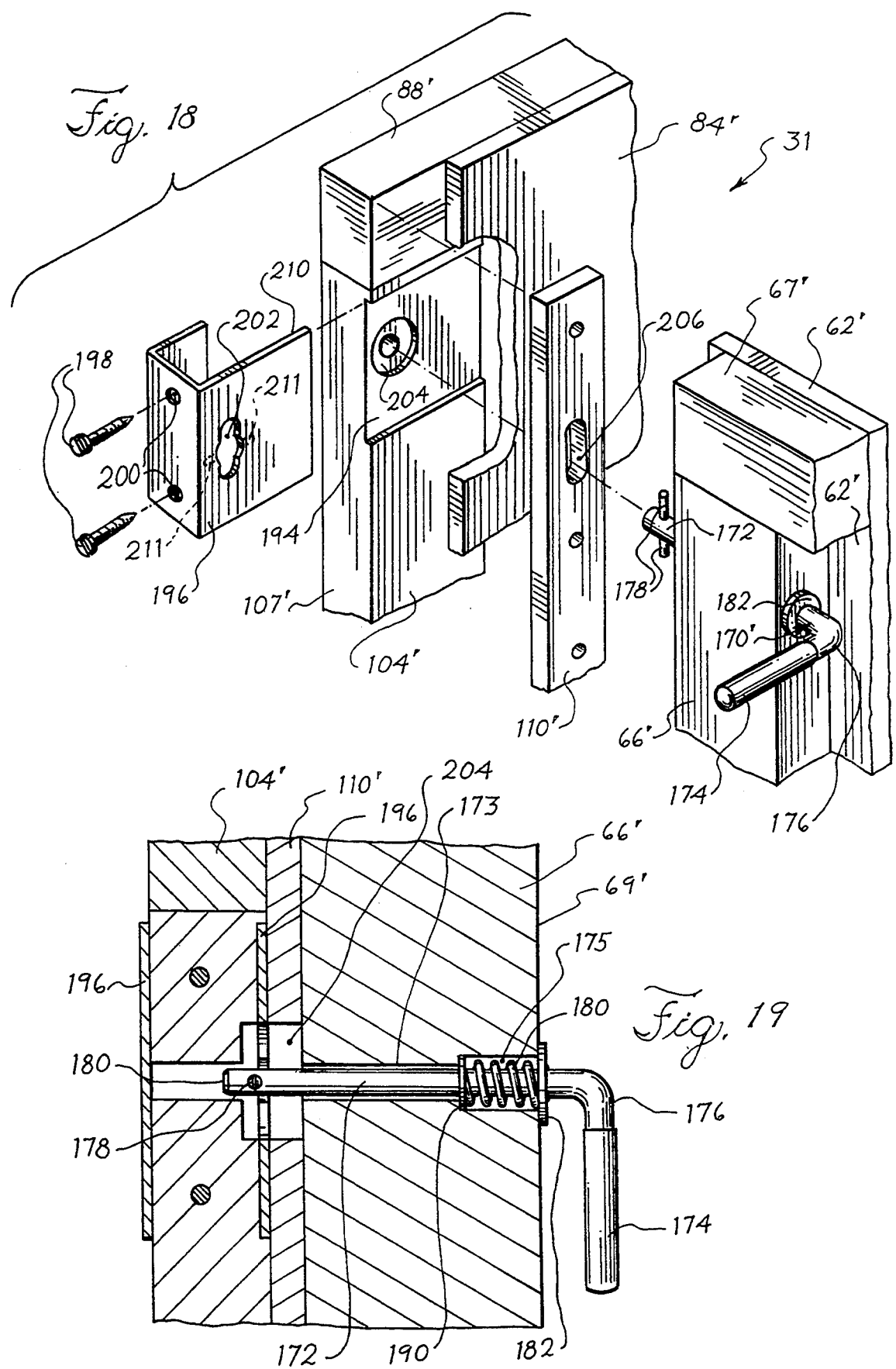

COLLAPSIBLE, REUSABLE CONTAINER

FIELD OF THE INVENTION

The present invention pertains to shipping containers, and more particularly, pertains to such containers which are collapsible.

BACKGROUND OF THE INVENTION

In a wide variety of applications, containers are required to accommodate articles therein during shipping or storage, with the containers serving as a housing to provide protection to the articles therein. Traditionally, a container suitable for accommodating the article to be shipped is assembled at the site of the shipper, and the container is shipped back empty to the original shipper.

For instance, a manufacturer of diagnostic equipment components may regularly ship a supply of components to manufacturers or end users of the diagnostic equipment for incorporation into the diagnostic equipment. Shipping containers, specifically designed to accommodate one or more pieces of diagnostic equipment are produced for shipping the diagnostic equipment to the manufacturer or end user. Following receipt of a piece of diagnostic equipment in its shipping container at the manufacturer or end user, the container is opened and the transmission removed. The issue then becomes what to do with the container. Since the cost of producing a suitable replacement container generally exceeds the cost of shipping the container back to its original shipper for reuse, in current practice, the empty containers are shipped back to their original supplier so that the containers may be reused for subsequent shipping of other pieces of diagnostic equipment in the container.

The containers, which may be considerably large in size, occupy considerable space when being transported empty. The considerable space which such empty containers occupy on the vehicle returning the empty containers to the transmission manufacturer results in the expenditure of considerable shipping costs.

The containers typically employed are wooden crates which are assembled by nailing and/or screwing together a plurality of wooden panels. To significantly reduce the space which such containers occupy on their return to the original shipper, it is known to remove the nails and/or screws and disassemble the containers. The panels may then be stacked directly atop one another during their return to the original shipper, to minimize space requirements. Upon receipt of the disassembled panels by the original shipper, the panels are again nailed or screwed together to produce a shipping container. A considerable number of man-hours are required to be expended in assembling and disassembling the containers. Skilled laborers are generally utilized to assemble the containers, to assure that the nails and/or screws are properly driven, and thereby assure that the container is structurally sound. Such skilled labor, and the man-hours required to reassemble the containers, results in the expenditure of considerable costs.

There is a need for a container which is collapsible and reusable, whereby the container may be easily and quickly assembled and disassembled manually, without the use of skilled labor. There is a need for such a container which is fully self-contained so that the container may be easily assembled and disassembled without the use of external fasteners or engaging elements. The container should have sufficient structural integrity when assembled to withstand the impact forces associated with shipping. The side panels of the container should be nestable with one another when the container is disassembled to minimize the space requirements for return of the empty container for its reuse.

SUMMARY OF THE INVENTION

In accordance with the present invention, a container is provided which may be easily and repeatedly assembled and disassembled manually. In its assembled stated, the container provides a structurally sound housing suitable for protecting the contents of the container. In its disassembled state, each of the panels of which the container is comprised are nestable or stackable with one another to minimize the storage space required during return of the disassembled containers for their reuse.

In accordance with one embodiment of the present invention, the side and end panels may be nested or stacked together and fully accommodated within the enclosure defined by bringing the top and bottom panels together, to provide a compact shipping package for return of the collapsed container. Storage of the end and side panels within the housing also provides protection to the panels during transportation.

A base pallet is provided on which the article to be shipped is supported. A pair of side panels and a pair of end panels are engageable to the base pallet by respective pin-in-hole arrangements, whereby the pins are engageable in respective holes and disengageable from respective holes in a manner which allows easy manual assembly of a structurally sound shipping container.

In accordance with one particular embodiment of the invention, the side and end panels are engageable and disengageable with the base pallet only when the side panels are tilted significantly away from their normal position perpendicular to the base pallet. When the side panels are engaged with the base pallet and extending perpendicularly thereto, the respective pin-in-hole arrangements between each of the side panels and the base pallet maintains the side panels securely engaged perpendicularly to the base pallet. In this embodiment, securing means are provided for preventing the side panels from tilting significantly with respect to the base pallet when the container is fully assembled. Upon removal of the securing means, the side panels are easily manually tiltable with respect to the base panel to allow easy disassembly of the side panels from the base pallet.

In accordance with another aspect of the invention, one of the end panels may be employed as a ramp to facilitate loading and unloading of articles on the base pallet.

BRIEF DESCRIPTION OF THE DRAWINGS

In the drawings, wherein like elements are referenced alike:

FIG. 4 is an exploded view of the container of FIG. 1;

FIG. 5 is an enlarged, fragmentary, sectional view of a side panel tilted with respect to the base panel sufficient to allow manual engagement or disengagement of the side panel with the base pallet;

FIG. 6 is a view of the side panel and base pallet sections of FIG. 5, with the side panel engaged and extending generally perpendicularly from the base pallet;

FIG. 7 is a plan, sectional view of the container taken along line 7—7 of FIG. 1;

FIG. 8 is an enlarged, perspective, fragmentary view of a disassembled upper corner portion of the container of FIG. 1;

FIG. 9 is an enlarged, perspective, fragmentary view of the upper corner portion of the container of FIG. 8, in its assembled state;

FIG. 18 is an exploded perspective view of the locking mechanism of FIG. 17;

FIG. 19 is sectional view of the locking mechanism, taken along line 19—19 of FIG. 17;

DETAILED DESCRIPTION OF THE PREFERRED EMBODIMENTS

Figure 20:
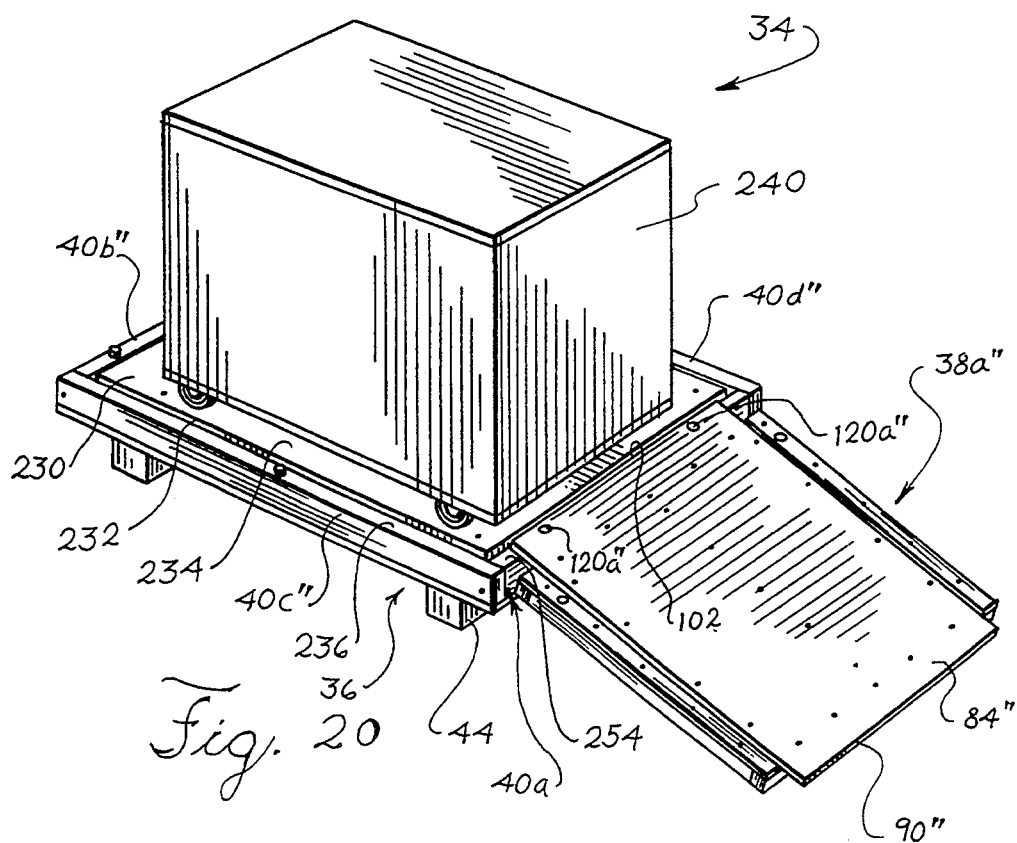
FIG. 20 is a perspective view of an alternative embodiment container embodying various features of the present invention, with a wheel-mounted article one the base pallet and one of the side panels serving as a ramp.
Figure 21:
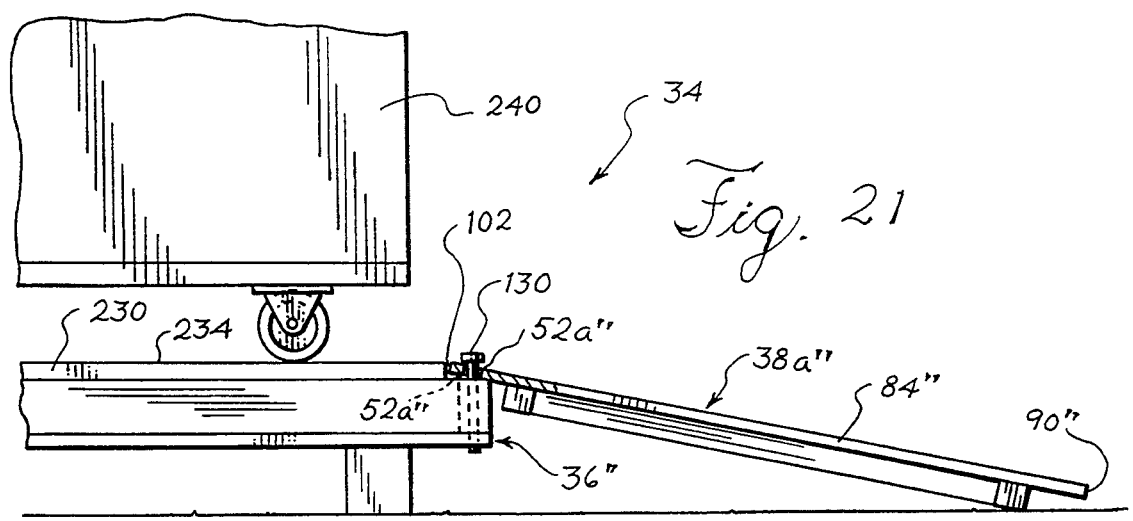
FIG. 21 is an enlarged, side elevational view of the container of FIG. 20.

Containers embodying various features of the present invention are illustrated in FIGS. 1-21. A first embodiment of the container, which is referred to as a fully-enclosed container, is illustrated in FIGS. 1-11, wherein the container is referred to generally by reference numeral 30. A second embodiment of the container, which is referred to as an open top container, is illustrated in FIGS. 12-19, wherein the container is referred to generally by reference numeral 31. Finally, a third embodiment of the container is illustrated in FIGS. 20-21, which is referred to as a ramp-modified version of the fully-enclosed container, and referenced generally by reference numeral 34.

The inventive concepts of the present invention lend themselves to utilization in a wide array of container constructions. The three specific examples mentioned above, and described in detail below, are provided only to illustrate the invention, and these specific examples are not intended to be limiting in any way. Various modifications may be made, only some of which are specifically delineated herein, without departing from the inventive concepts which characterize the invention.

With initial reference to FIG. 4, the first embodiment of the container 30, which is called a fully-enclosed container, comprises a rectangular base pallet 36 engageable with each of two side panels 37a and 37b and two end panels 38a and 38b to form an enclosure.

The base pallet 36 includes a peripheral skirt portion, referred to generally by reference numeral 40, which extends perpendicularly from the periphery of the flat central portion 42 of the base pallet 36. The skirt 40 is comprised of a pair of front and rear skirt portions 40a and 40b, respectively, and a pair of left and right skirt portions 40c and 40d, respectively.

The base pallet 36 further includes a pair of support feet 44 which are integral with the underside 46 of the base pallet 36 and span the width of the base pallet 36. The support feet 44 rest on the ground to support the flat central body portion 42 of the base pallet 36 in spaced relation from the ground or other object upon which the base pallet resides. The support feet 44, by spacing the flat central portion 42 of the base pallet 36 from the ground, also allow the base pallet 36 to be lifted by a fork truck or other handling equipment. Thus, the container 30 lends itself to manipulation by handling equipment whether the container rests on the ground or is stacked atop another container.

With reference to the base pallet 36 of FIG. 4, with the support feet 44 on a horizontal surface the flat central portion 42 of the base pallet 36 extends horizontally with the peripheral skirt 40 extending generally vertically upward therefrom.

In the illustrated, fully-enclosed embodiment of the container 30, the engagement of both the left and right side panels 37a and 37b to the base pallet 36, as well as engagement of the front and rear end panels 38a and 38b, is effected by pin-in-hole arrangements. Specifically, pins, referred to generally by reference numeral 50, extend inwardly from the peripheral skirt portion 40 of the base pallet 36, and are engagingly received within holes, referred to generally by reference numeral 52, to maintain engagement of the side panels 37 with the base pallet 36 when the container 30 is assembled. That is, engagement of the pins 50 within respective holes 52 of the side panels, 37a and 37b, and the end panels, 38a and 38b, prevents the respective panels from being pulled upward, away from the base pallet 36.

More specifically, the peripheral skirt 40 has upwardly facing surfaces 54 and inwardly facing surfaces 56. The front and rear peripheral skirt portions 40a and 40b both have a respective pair of pins 50 extending perpendicularly inward from the inwardly facing surfaces 56 thereof. The left and right peripheral skirt portions 40c and 40d also have a respective pair of pins 50 and 50 extending perpendicularly inwardly from the inwardly facing surfaces 56 thereof. Both the left and right peripheral skirt portions 40c and 40d have a respective single pin 58 extending perpendicularly upward from the upper surface 54 of the respective peripheral skirt portions 40c and 40d. Each of the pins 50 extending inwardly from the peripheral skirt 40 are engagingly received in respective holes 52 of the side and end panels 37a-b and 38a-b; and the pins 58 extending upwardly from the peripheral skirt 40 are received in respective holes 82 of the left and right side panels 37a and 37b.

With this arrangement, the front and rear end panels 38a and 38b are engageable with the base pallet 36 by simply placing the lower ends 61 of the end panels 38 inwardly of their respective front and rear peripheral skirt portions 40a and 40b, and sliding the end panels toward their respective peripheral skirt portions 40a and 40b to bring the pins 50 into their respective holes 52. Due to the presence of the pins 58 extending upwardly from the left and right peripheral skirt portions 40c and 40d, the left and right side panels 37a and 37b are not engageable with their respective left and right peripheral skirt portions 40c and 40d in the aforementioned sliding manner. Instead, the left and right side panels 37a and 37b must be tilted as illustrated in FIG. 5, and discussed further below, to engage them to the base pallet 36.

With continued reference to the exploded view of FIG. 4, the left and right side panels 37a and 37b, are both comprised of a substantially planar side member 62 with three integral, vertically extending reinforcing members 66 affixed to the outer side 64 thereof. Each of the planar side members 62 has one of the reinforcing members 66 affixed near the midspan of the planar side member 62, approximately half-way between the front and rear ends 68 and 70 thereof. This location of the central support members corresponds to the locations of the pins 58, as explained further below. Each of the planar side members 62 also has two support members 66 affixed near, but spaced a small distance from, the front and rear ends 68 and 70, respectively. The three support members 66 extend vertically, parallel to one another, with their upper and lower ends 72 and 74, respectively, spaced from the respective upper and lower ends 76 and 78 of the planar side members 62 an amount corresponding to the height of the peripheral skirt 40. The reasons for this spacing will become clear further below. One of the purposes of the support members 66 is to provide increased structural support to allow the panels to withstand the forces associated with stacking two or more containers.

The left and right side panels 37a and 37b also have a hole 82 formed in the lower end 74 of their central support members 66, for engagingly receiving the pins 58 of the left and right peripheral skirt portions 40c and 40d. Accordingly, when the left and right side panels 37a and 37b are oriented vertically and lowered down onto their respective left and right peripheral skirt portions 40c and 40d of the horizontally oriented base pallet 36, the lower ends 74 of the support members 66 rest on the upper surface 54 of the respective left and right peripheral skirt portions 40c and 40d. The lower portions of the left and right planar side members 62, adjacent their lower ends 78, reside adjacent the respective inwardly facing surfaces 56 of the left and right peripheral skirt portions 40c and 40d, with the pins 50 in registration with the holes 52.

With pins 58 extending perpendicularly with respect to pins 50, upon sliding of the vertically oriented left and right side panels 37a and 37b outward toward their respective left and right peripheral skirt portions 40c and 40d, the pins 50 are receivable in respective holes 52; however, when the left and right side panels are slid straight outwardly in this manner, the lower end portions of the left and right planar side members 62 abut the inner sides of the pins 58, rather than the pins 58 being received in respective holes 82, as is required to fully engage the side panels 37a and 37b to the base pallet 36. As mentioned briefly above, in order to effect engagement of both the upwardly extending pin 58 in the hole 82, as well as the pin 50 in respective holes 52, as required to fully engage each of the side panels 37a and 37b with the base pallet 36, it is necessary to tilt the left and right side panels 37a and 37b with respect to the base pallet 36, as illustrated in FIG. 5. Specifically, it is necessary to initially place the side panels 37a and 37b against their respective peripheral skirt portions 40c and 40d with the panels 37a and 37b tilted outwardly from the base pallet 36, and thereafter decrease the dihedral angle between the base pallet 36 and the left and right side panels 37a and 37b (see FIG. 5).

The pins 58 are spaced and configured such that if the initial engagement of the left and right side panels 37a and 37b with the base pallet 36 is carried out with the left and right side panels 37a and 37b tilted with respect to the base pallet 36 in the manner of FIG. 5, and the left and right side panels 37a and 37b straightened to a vertical position following receipt of the pins 58 into respective holes 82, the pins 58 will remain within their respective holes 82 and the pins 50 with be received within respective holes 52, to securely engage the side panels 37a and 37b to the base pallet 36. The side panels 37a and 37b are thereby maintained in engagement with the base pallet 36, extending perpendicularly from the central portion 42 of the base pallet 36.

With the left and right side panels 37a and 37b fully engaged with the base pallet 36 in this manner, and extending vertically upward from the horizontal base pallet 36, the pin-in-hole engagement therebetween is sufficient to maintain this engagement. The pins 58 within the holes 82 of the side panels 37a and 37b prevents the side panels 37a and 37b from moving inwardly away from their respective peripheral skirt portions; the pins 50 within respective holes 52 prevent vertical movement of the side panels 37a and 37b in the direction of either the upper or lower end 76 or 78 thereof; and the abutment of the front and rear ends 68 and 70 of the left and right side panels 37a and 37b against respective inner surfaces 56 of the front and rear peripheral skirt portions 40a and 40b, combine to prevent disengagement of the left and right side panels 37a and 37b from the base pallet 36 so long as the panels 37a and 37b are maintained oriented normal to the base pallet 36.

The aforementioned pin-in-hole arrangement allows the left and right side panels 37a and 37b to be easily disengaged from the base pallet 36. By tilting the respective side panels 37a and 37b outwardly with respect to the base pallet 36 a sufficient amount, as in FIG. 5, both the pins 50 and 58 are easily manually disengageable from their respective holes 52 and 82. Accordingly, with the pin-in-hole arrangement of the present invention, so long as the left and right side panels 37a and 37b are maintained perpendicular to the central portion 42 of the base pallet 36 following engagement therewith, the pin-in-hole arrangement maintains secure engagement of the left and right side panels 37a and 37b with the base pallet 36. However, upon removal of the means used to maintain the left and right side panels 37a and 37b in the aforementioned perpendicular orientation with respect to the base pallet 36, the panels 37a and 37b may be easily tilted to facilitate simple and rapid disengagement from the base pallet 36.

Since the left and right side panels 37a and 37b are identical in the preferred embodiment of the invention, they are interchangeable, so that it makes no difference which panel, 37a or 37b, is attached to which peripheral skirt portion, 40c or 40d, of the base pallet 36.

The front and rear panels 38a and 38b are also engageable with the base pallet 36 by a pin-in-hole arrangement in a manner which allows for easy and rapid manual engagement of the front and rear panels 38a and 38b with the base pallet 36. Also, as with the left and right side panels 37a and 37b, the front and rear panels 38a and 38b are substantially identical to one another in the preferred embodiment of the invention, so that they are interchangeable. The front and rear end panels 38a and 38b, and their engagement to the base pallet 36, will now be described in detail. The front and rear panels 38a and 38b both engage with the base pallet 36 in the same manner.

With continued reference to FIG. 4, the front and rear end panels 38a and 38b both include a planar member 84 which is fastened to a respective framework, referred to generally by numeral 86. The end panel frameworks 86 comprise an upper engaging member 88 which is fastened to the back side 89 of respective planar members 84, parallel to and spaced a short distance from the upper ends 90 of the planar members 84, and extending beyond both of the lateral sides 92 of the planar member 84. The front and rear end panel frameworks 86 further comprise a lower engaging member 100 fastened to the back side 89 of the planar member 84, parallel to and spaced a short distance from the lower end 61 of the planar member 84, and extending a short distance beyond both of the lateral sides 92 of the planar member 84, the same amount as does the aforementioned upper engaging member 88.

To provide structural stacking support to allow stacking of a plurality of containers, as well as for other reasons which will become clear later, a pair of vertical supporting members 104 span the upper and lower engaging members 88 and 100 at their respective ends 105 and 106. The outer surfaces 107 of the supporting members 104 are planar with the respective outer surfaces 105 and 106 of the upper and lower engaging members 88 and 100, as best seen in FIG. 4. A central shoring panel 108 also extends from the respective upper engaging members 88 to respective lower engaging members 100 at their midspan, approximately midway between the supporting panels 104.

The front and rear end panel frameworks 86 further comprise respective pairs of retaining panels 110 extending from the upper surfaces 112 of the upper engaging members 88 to the lower surfaces 114 of the lower engaging members 100. For reasons which will become clear below, a pair of narrow, generally uniform gaps or channels 116 are provided between the inner surfaces 118 of the retaining panels 110 and the lateral end surfaces 92 of the planar members 84. As discussed above, the upper and lower ends 90 and 61 of the planar members extend beyond the respective upper and lower engaging members 88 and 100.

The planar members 84 of the end panels 38a and 38b both have a respective pair of holes 52 extending therethrough in the lip portions of the planar members 84 between the lower ends 114 of the lower engaging members 100 and the lower ends 61 of the planar members 84. The location of the holes 52 corresponds to the location of the aforementioned pair of pins 50 extending perpendicularly inward from the inwardly facing surfaces 56 of the front and rear peripheral skirt portions 40a and 40b.

As discussed above, the front and rear end panels 38a and 38b engage with their respective front and rear peripheral skirt portions 40a and 40b by inserting the lower ends 61 of the end panels 38a and 38b inwardly of their respective peripheral skirt portions 40a and 40b, with the panels substantially vertical with respect to the base pallet 36, and then sliding the end panels 38a and 38b into abutment with their respective peripheral skirt portions 40a and 40b. This brings the pins 50 of the front and rear peripheral skirt portions 40a and 40b into the respective holes 52 located near the lower ends 61 of the end panels 38a and 38b, to engage the end panels to the base pallet 36.

The aforementioned pin-in-hole engagement of the end panels 38a and 38b to the base pallet 36 prevents the end panels 38a and 38b from being pulled from the base pallet 36 either upwardly or laterally. However, the pin-in-hole arrangement of the end panels 38a and 38b does not prevent the end panels 38a and 38b from moving or sliding inwardly and thereby becoming disengaged from the base pallet 36 upon sufficient inward movement. As will be described in detail below, the left and right side panels 37a and 37b prevent such inward movement of the end panels 38a and 38b, to prevent disengagement of the end panels 38a and 38b from the base pallet 36 regardless of which direction the end panels 38a and 38b are pulled. Also, as discussed below, in certain embodiments, it may be desirable to eliminate the pin-in-hole engagement of the end panels 38a and 38b to the base pallet 36, whereby the end panels 38a and 38b are engaged to the base pallet 36 through the left and right side panels 37a and 37b. This is explained further below.

Figure 1:
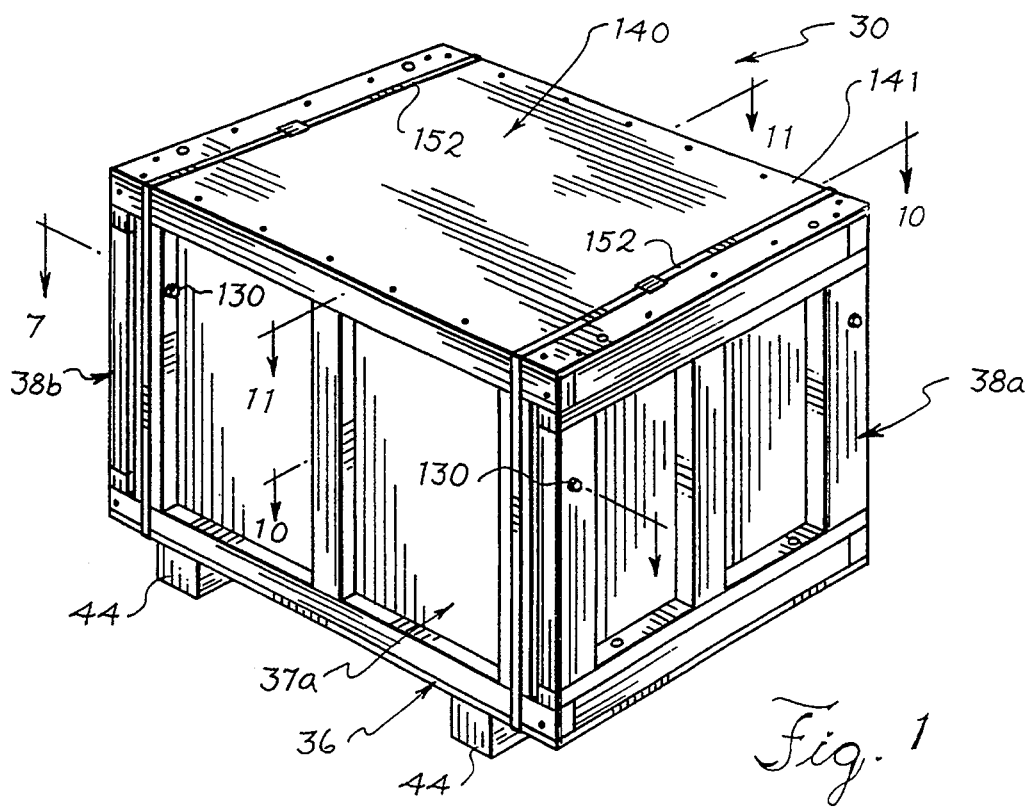
FIG. 1 is a perspective view of a container embodying various features of the present invention, shown in its assembled state.

In engaging each of the side panels, 37a and 37b, and the end panels, 38a and 38b, to the base pallet 36 to form the assembled container 30 illustrated in FIG. 1, the left and right side panels 37a and 37b are engaged to the base pallet 36 first. Since engagement of the side panels 37a and 37b to the base pallet 36 is effected by tilting the side panels 37a and 37b outwardly away from one another, the side panels do not interfere with one another during assembly. The manner of engaging the left and right side panels 37a and 37b to the base pallet 36 is discussed above.

After the left and right side panels 37a and 37b are engaged with base pallet 36, the front and rear end panels 38a and 38b are then also engaged with the base pallet 36 and with the side panels 37a and 37b. Since the front and rear end panels 38a and 38b are identical, as are the left and right side panels 37a and 37b, it does not matter whether the front end panel 38a or rear end panel 38b is engaged with the base pallet 36 first.

The front and rear end panels 38a and 38b engage with the base pallet 36 through sliding engagement of pins 50 within respective holes 52, and the left and right side panels 37a and 37b engage with the base pallet 36 through both sliding engagement of pins 50 within respective holes 52 as well as sliding engagement of pins 58 within respective holes 82.

To engage the end panels 38a and 38b to the base pallet 36, it is necessary to tilt the end panels 38a and 38b outwardly slightly, as is necessary when engaging the side panels 37a and 37b to the base pallet 36. However, with the side panels 37a and 37b already engaged with respective peripheral skirt portions 40c and 40d, the front and rear end panels 38a and 38b cannot be placed inwardly of their respective peripheral skirt portions 40a and 40b and then slid outwardly, since the side panels 37a and 37b would interfere with this. Hence, while the side panels 37a and 37b are held in place extending vertically from, and in engagement with, the base pallet 36, the end parcels 38a and 38b are engaged with the base pallet 36 and side panels 37a and 37b as follows.

With the front and rear end panels 38a and 38b tilted outwardly with respect to the base pallet 36, the lower ends 61 of the front and rear end panels 38a and 38b are inserted inwardly of their respective peripheral skirt portions 40a and 40b. The tilting of the end panels 38a and 38b during their initial engagement with the base pallet 36 is necessary to prevent abutment of the lower ends 61 of the end panels 38a and 38b with the pins 50 extending inwardly from peripheral skirt portions 40a and 40b. The end panels 38a and 38b are thereafter raised upward to a vertical position, whereby the holes 52 in the end panels 38a and 38b are moved into engagement with the pins 50, with the pins 50 thereby being received in holes 52. This movement of the end panels 38a and 38b to vertical from their tilted positions also effects slidable engagement of the forward and rearward ends 68 and 70 of the side panels 37a and 37b in respective channels or grooves 116 of the end panels 38a and 38b.

More specifically, upon movement of the front end panel 38a from a tilted to a vertical position, the forward ends 68 of both of the side panels 37a and 37b are received in respective channels or grooves 116 of the front end panel 38a, between the inner surfaces 118 of the retaining panels 110 and the sides 92 of the planar members 84. The rear end panels 38b engages in a similar manner. This engages the front and rear panels 38a and 38b to the side panels 37a and 37b, as well as to the base pallet 36.

So engaged, the side panels 37a and 37b prevent the end panels 38a and 38b from moving inwardly and, hence, from becoming disengaged from the base pallet 36. The end panels 38a and 38b, in turn, prevent the side panels 37a and 37b from tilting significantly out of vertical and, hence, prevents the side panels 37a and 37b from moving out of engagement with the base pallet 36.

However, with the container only partially assembled in this manner, the front and rear panels 38a and 38b remain tiltable with respect to the base pallet 36. This is undesirable since sufficient outward tilting of the front and rear panels 38a and 38b disengages the front and rear panels 38a and 38b from the base pallet 36. Furthermore, sufficient outward tilting of the front and rear panels 38a and 38b disengages the front and rear panels 38a and 38b from the left and right side panels 37a and 37b, allowing the left and right side panels 37a and 37b to then tilt outwardly, whereby the left and right side panels 37a and 37b may also become disengaged from the base pallet 36.

To maintain the front and rear end panels 38a and 38b substantially vertical and in engagement with the left and right side panels 37a and 37b, bolts 130, or other suitable fasteners, are used to interconnect the front and rear end panels 38a and 38b to respective left and right side panels 37a and 37b.

In the illustrated embodiment of FIGS. 1–6, the front and rear panels 38a and 38b have holes 132 therethrough near their upper ends, which align with respective holes 134 in the outwardmost pair of support members 66 when the panels 37a–b and 38a–b are engaged. The holes 132 in the front and rear panels 38a and 38b pass through both the supporting panels 104 and the retaining panels 110, and the holes 134 extend horizontally through the outwardmost pair of support members 66 of both the side panels 37a and 37b. Hence, after all of the panels 37a–b and 38a–b have been assembled in the manner described above, bolts 130 may be inserted through the respective holes 132 of the front and rear panels 38a and 38b, and passed through the respective holes 134 of the left and right side panels 37a and 37b aligned therewith. Nuts 136 threaded onto the ends of respective bolts 130 serve to prevent the bolts 130 from sliding or being pulled out of their holes, to assure that the engagement between the front and rear end panels 38a and 38b, and the left and right side panels 37a and 37b is maintained. Manifestly, other means for engaging the end panels 38a and 38b to the side panels 37a and 37b may be employed. By way of example, cords or other members may be passed through the holes rather than bolts or, still alternatively, the holes 132 and 134 may be eliminated and metal clips or other similar devices may be employed which engage with both the support members 66 of the side panels 37a and 37b and the supporting panels 104 of the front and rear end panels 38a and 38b to maintain engagement between the front and rear end panels 38a and 38b and the left and right side panels 37a and 37b. While only specific engaging means are delineated above, manifestly a wide variety of other engaging means may be employed.

To facilitate engagement between the side panels, 37a and 37b, and the end panels 38a and 38b, the outwardmost pair of support members 66 of both the left and right side panels 37a and 37d are spaced, respectively, from the front and rear ends 68 and 70 of their respective planar side members 62 an amount corresponding to the thickness of the retaining panels 110. That is, when the front and rear end panels 38a and 38b are engaged with the left and right side panels 37a and 37b, the inner surfaces 138 of the retaining panels 110 lie immediately adjacent the outer surfaces 143 of the respective support members 66. Hence, after passing bolts 130 through respective holes 132 and 134, subsequent tightening of the nuts 136 onto the bolts 130 presses and retains the inner surfaces 138 of the retaining panels 110 and the outer surfaces 143 of the support members 66 securely together.

With all the panels 37a–b and 38a–b engaged with one another and engaged with the base pallet 36 in the aforementioned manner, the panels 37a–b and 38a–b and the base pallet 36 will remain securely interconnected even when subjected to static and dynamic forces typically encountered during shipping.

The pin-in-hole arrangement used to interconnect the panels 37a–b and 38a–b to the base pallet 36 is not a high tolerance or force fit, so that there remains some play or looseness between the panels and the base pallet. There is also some play or looseness between adjacent panels. While this play or looseness may give the appearance of insecure engagement between adjacent panels and between the panels and the base pallet, the play or looseness is actually advantageous in that it provides a degree of impact absorption. That is, when the assembled container 30 is subjected to an impact force, at least a portion of the impact force is absorbed at the interconnection between adjacent panels, which lessens the force imparted directly to the panels. This provides a container having improved longevity. As discussed below, the ability to store the panels 37a–b and 38a–b within the enclosure defined by the cover 140 and base pallet 36 also further increases the useful life of the container 30.

After the item or items to be transported or stored are placed on the base pallet 36 and the four panels 37a–b and 38a–b are engaged with one another and to the base pallet 36, a cover 140 may be applied to seal or fully enclose the items within the container 30.

The cover 140 includes a central, planar cover portion 141 having a depending, rectangular peripheral skirt 142. Upon placement of the cover 140 onto the engaged panels, the peripheral skirt 142 of the cover 140 telescopes over the upper end portions of each of the planar members 62 and 84 of each of the side and end panels 37a–b and 38a–b, whereby the lid engages with the upper ends of each of the panels to form the fully assembled container 30 shown in FIG. 1.

To accurately align the cover 140 on the panels 37a–b and 38a–b, the left and right portions of the peripheral skirt 142 of the cover 140 have respective holes 145 which extend into the underside of the peripheral skirt, and which engagingly receive respective pins 150 extending from the upper surfaces 72 of the central support members 66 of the left and right side panels 37a and 38b.

The pin-in-hole engagement between the cover 140 and the side panels 37a and 37b, and the telescoping engagement between the peripheral skirt 142 of the cover 140 and the upper ends of the planar members 62 and 84, is sufficient to prevent movement of the cover 140 in either the forward, rearward, left or right directions. However, in certain instances it may be necessary to assure that the cover 140 does not come off of the panels. In such applications, it may be desirable to employ straps 152, such as those shown in FIG. 1, to prevent the cover 140 from lifting off of the panels. Alternatively, it may be desirable in certain instances to more securely fasten the cover 140 to the panels.

In accordance with another aspect of the present invention, the container 30' of an alternative embodiment includes holes 144 in the cover 140 and holes 147 in the end panels 38a and 38b through which bolts 146 are extendable to securely fasten the cover 140 onto the panels, as shown in the embodiment of the container 30' illustrated in FIGS. 8 and 9. With continued reference to FIGS. 8 and 9, when the cover 140 is placed onto the assembled panels, the holes 144 of the cover 140 align with respective holes 147 of the end panels 38a and 38b to allow passage of bolts 146 through both holes 14 and 147.

When the cover 140 is engaged with the panels 37a–b and 38a–b in the aforementioned manner, the panels are prevented from tilting substantially with respect to the base pallet 36. Hence, so long as the cover 140 remains engaged, the panels 37a–b and 38a–b remain securely engaged with one another and securely engaged to the base pallet 36. Thus, one cannot remove the contents from the container 30' without first removing the cover 140. This provides means for making the container tamper-evident.

With reference to FIGS. 8 and 9, to make the container tamper-evident, so that it can be readily discerned whether the cover 140 has been previously removed, the bolts 146 which fasten the cover 140 to the front and rear end panels 38a and 38b have respective holes 160 therein which receive respective security seals 155.

After the container 30' has been fully assembled, the contents have been loaded into the container 30', and the cover 140 placed on the container to enclose the contents, and the bolts 146 are passed through respective holes 144 of the cover 140 and holes 147 of the front and rear panel upper engaging members 88, respective nuts 161 are then threaded onto the bolts 146 to prevent the bolts 146 from sliding out of the holes 144 and 147 and assure that the cover 140 remains securely affixed to the panels 37a–b and 38a–b.

The apertures or holes 160 in the bolts 146 extend through the bolts 146 near their threaded ends 163. After the nuts 161 have been threaded onto their respective bolts 146 past the apertures 160 of the bolts, security seals 155 are inserted through the bolt apertures 160 and the security seal 155 then looped over and engaged with itself to form a continuous ring. The security seal 155 may be of any type known in the art which gives an indication when the seal has been broken. The illustrated security seal 155 is of the type well known in the field of tamper-evident products, wherein the security seal comprises a strip having a free end which may be passed through a hole in the strip in one direction only to form a loop; and once passed through the hole, the free end of the strip cannot be pulled back out from the hole. Thus, with such strips, the only way to open the strip is to break the strip, which gives an easy indication that the strip has been tampered with. Therefore, with the safety seals 155 engaged in a loop after being passed through respective apertures 160, the nuts 164 cannot be threaded off of their bolts 146 past the respective security seals 155. Accordingly, the cover 140 cannot be removed from the container 30' unless the security seal 155 is first broken, whereby the security seal 155 serves as an indicator of prior tampering of the container 30'. The bolts 146 preclude the necessity of the aforementioned straps 152, though the straps 152 may be employed in conjunction with the bolts 146 to provide additional structural integrity to the container.

With the container 30 fully assembled, and the straps 152 thereabout, or bolts 146 secured in place, or both, the container 30 may be handled like a typical crate. The support feet 44 space the central portion 42 of the base pallet 36 from the ground, or from another container situated beneath the container 30, to facilitate handling by fork lifts or other suitable handling equipment. When it is desired to remove the contents of the container 30, the cover may be easily removed to allow access to the interior of the container.

It may be desirable to transport the container 30 back to its place of origin, following removal of the contents from the container, so that the container 30 may be reused. Since the container occupies significant volume on the vehicle upon which it is transported back to its place of origin, which translates directly into a corresponding significant shipping expense, it is desirable to ship the container 30 back to its original shipper in a collapsed state.

Figure 2:
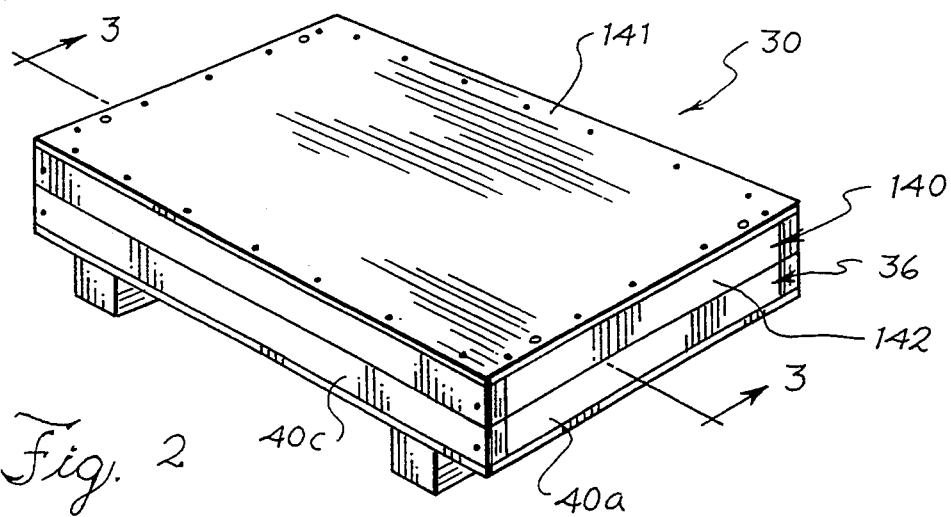
FIG. 2 is a perspective view of the container of FIG. 1, shown in its collapsed state.
Figure 3:
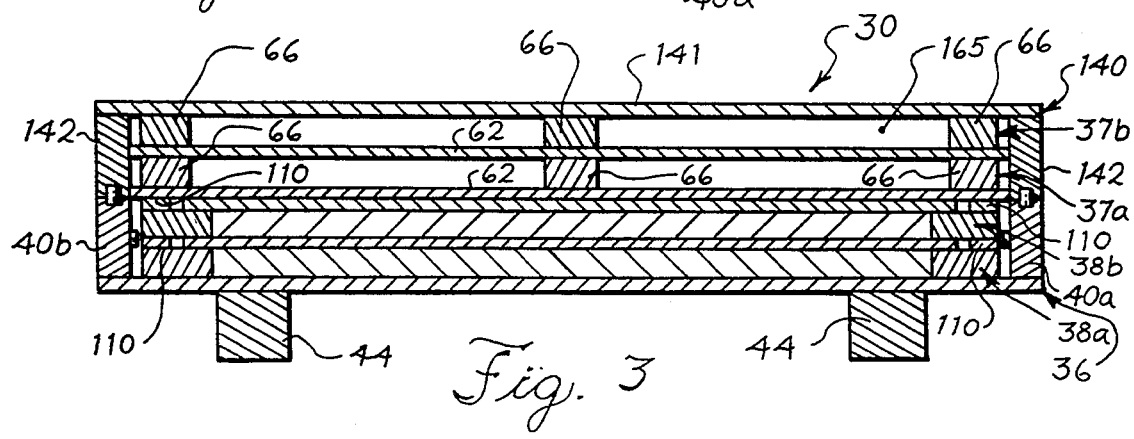
FIG. 3 is a cross-sectional view of the collapsed container, taken along line 3—3 of FIG. 2.
Figure 10:
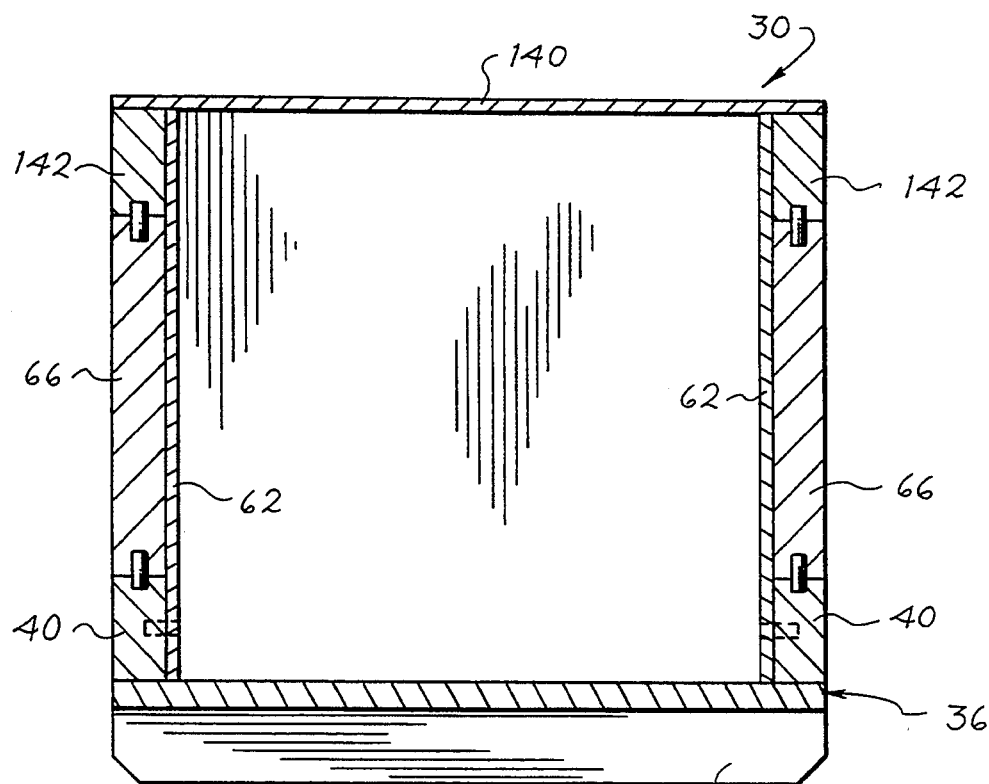
FIG. 10 is an enlarged, sectional view of the container, taken along line 10—10 of FIG. 1.
Figure 11:
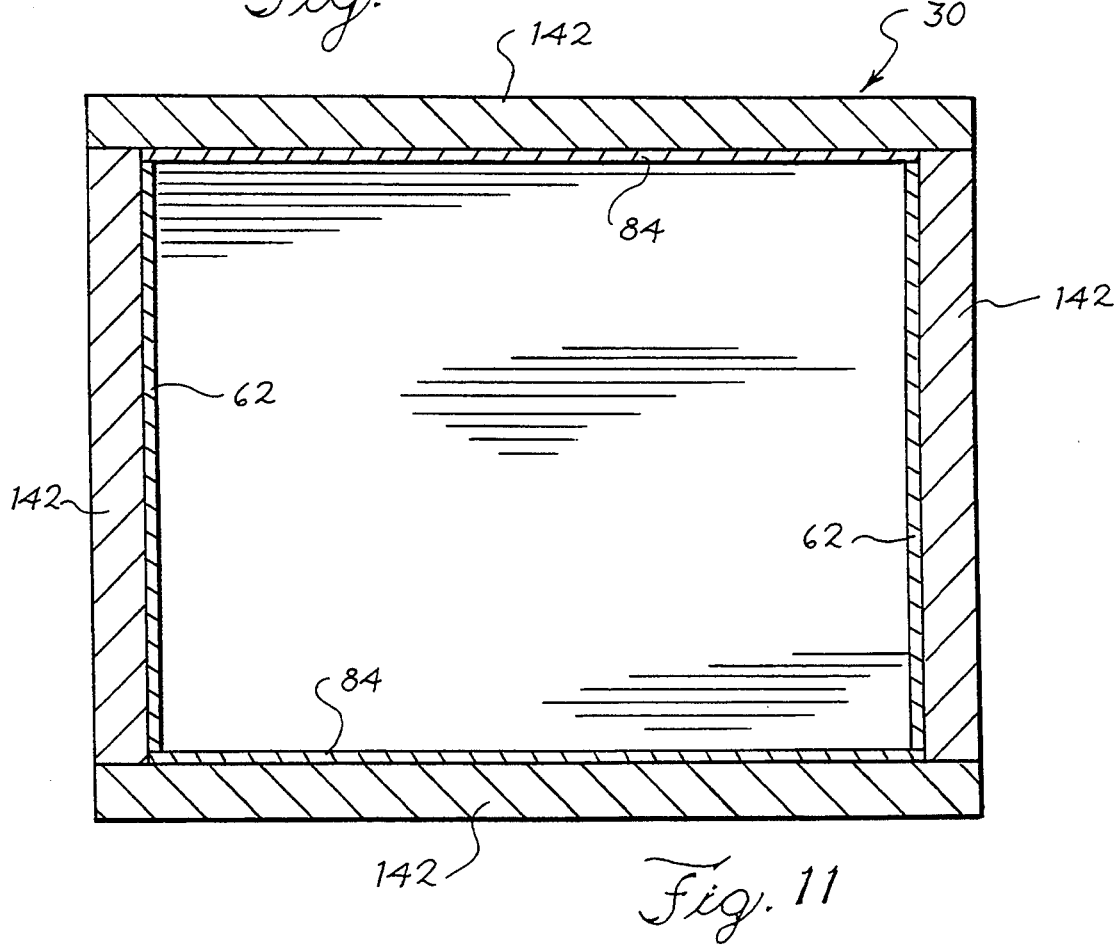
FIG. 11 is an enlarged, sectional view of the container, taken along line 11—11 of FIG. 1.
Figure 12:
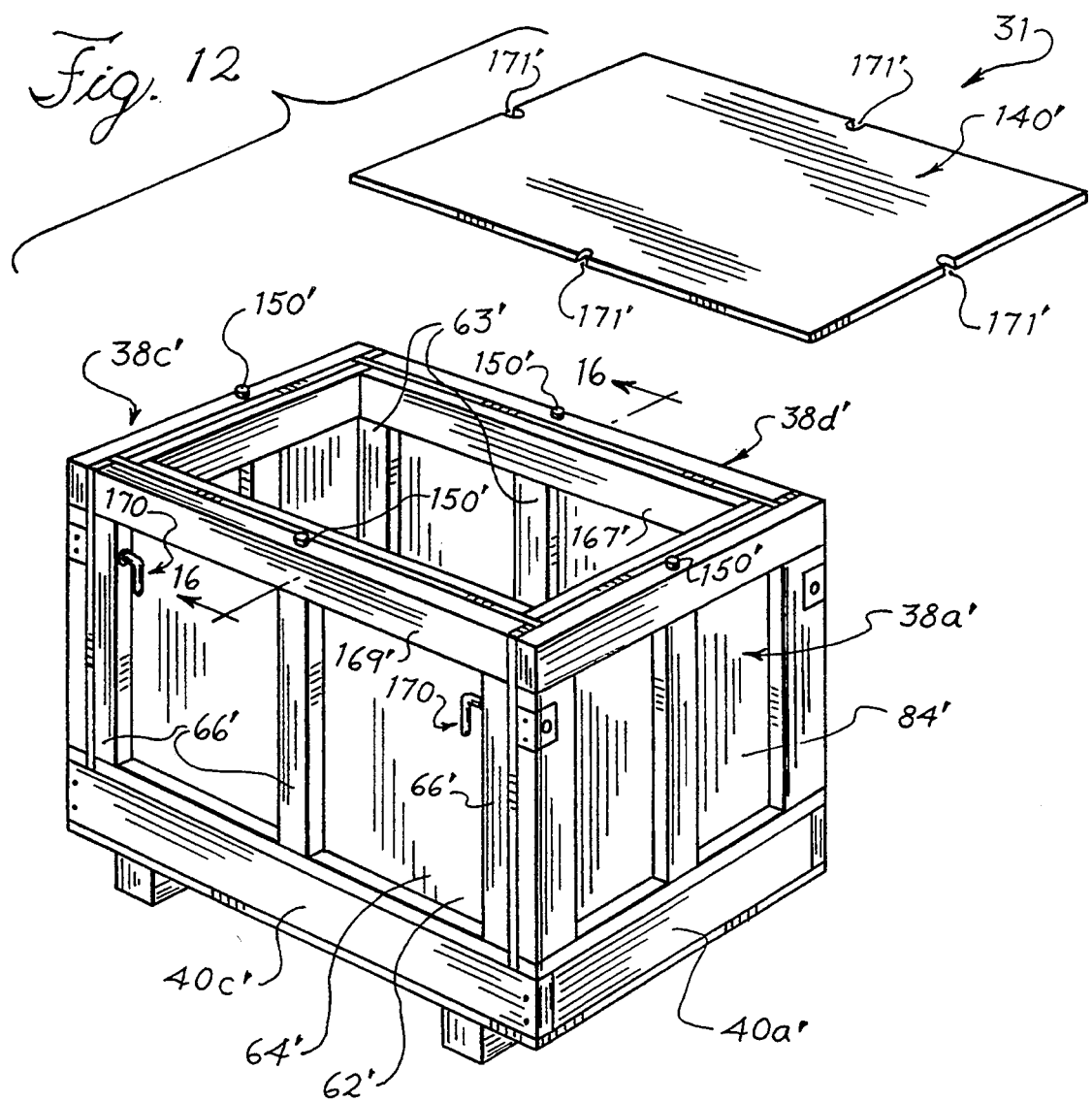
FIG. 12 is a perspective view of an alternative embodiment container embodying various features of the present invention, shown in its assembled state.
Figure 13:
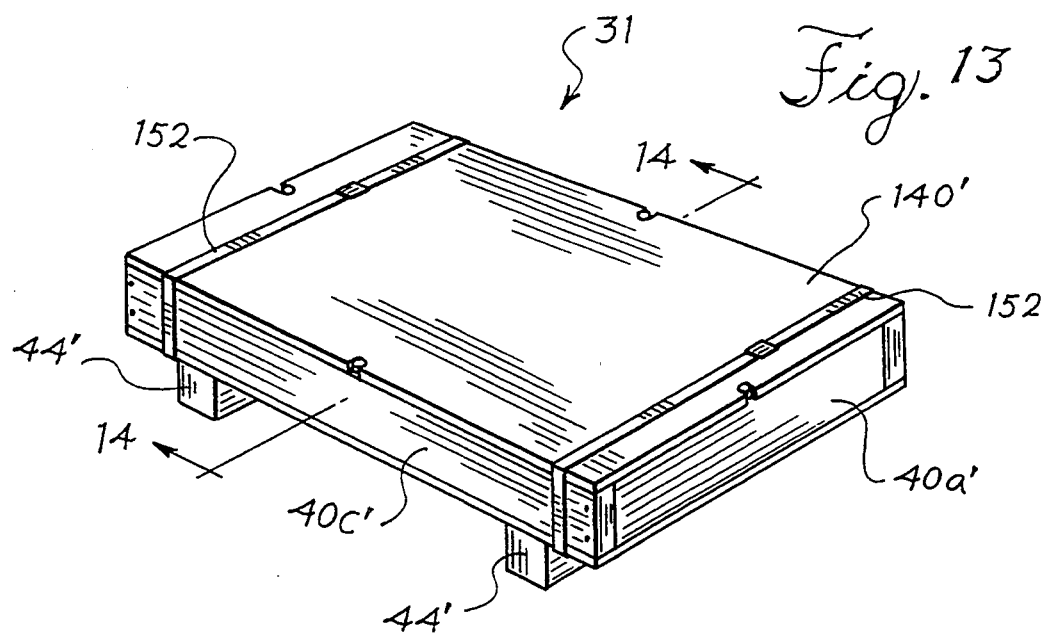
FIG. 13 is a perspective view of the container of FIG. 12, shown in its collapsed state.
Figure 14:
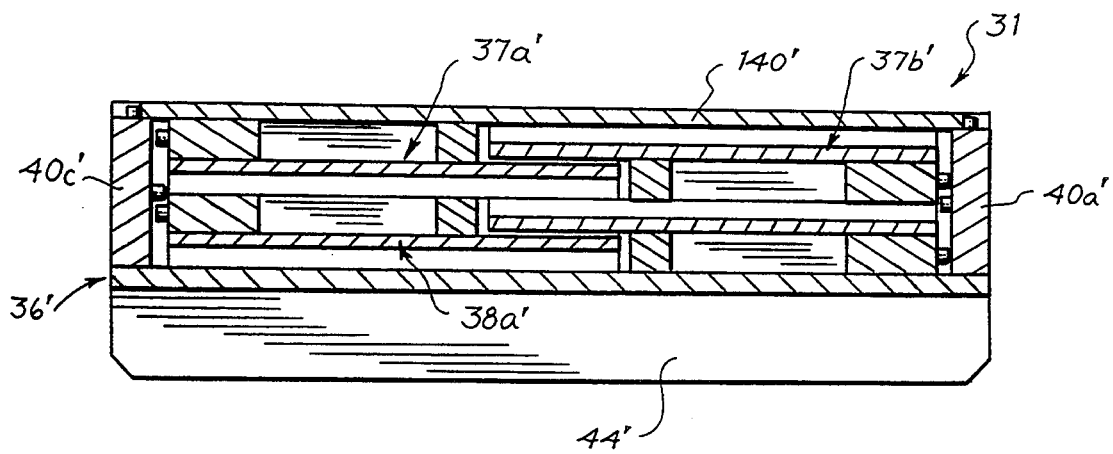
FIG. 14 is an enlarged, sectional view of the container, taken along line 14—14 of FIG. 13.

In accordance with one aspect of the present invention, the panels 37a–b and 38a–b are nestable or stackable on top of one another, and in accordance with another aspect of the invention, two or more of the nested or stacked panels 37a–b and 38a–b may be completely accommodated within the enclosure 165 formed upon bringing together the cover 140 and base pallet 36. More specifically, a cavity or enclosure 165 is defined upon bringing the peripheral skirt 142 of the cover 140 down onto the peripheral skirt 40 of the base pallet 36, as shown in FIGS. 2 and 3.

Disassembly of the container 30 is as follows. Following cutting or otherwise removing the bands 152 from the container 30, the cover 140 may be manually raised upward off of the panels 38a–d by lifting the cover 140. Thereafter, the bolts 130 are removed from their respective holes 132 and 134. The upper ends of the front and rear panels 38a and 38b are then tilted outwardly, away from one another. Since the sides 92 of the planar members 84 of both the front and rear end panels 38a and 38b are situated between the planar side members 62 of the left and right side panels 37a and 37b, there is no interference between the lower portion of the planar members 84 of the front and rear end panels 38a and 38b with the planar side member 62 of the left and right side panels 37a and 37b upon inward movement of the lower portion of the planar side members 84, which inward movement is realized upon the aforementioned outward tilting of the upper ends of the front and rear end panels 38a and 38b.

When the upper portion of the side and end panels 37a-b and 38a-b are tilted outwardly a sufficient amount, the holes 52 near the lower ends of the panels are moved inwardly whereby holes 52 are slid off from their respective pins 50. Hence, following removal of the cover 140, the front and rear end panels 38a and 38b may be tilted outwardly to disengage the front and rear panels from the base pallet 36 as discussed above. The outward tilting of the front and rear end panels 38a and 38b also disengages them from the left and right side panels 37a and 37b. Thus, the end panels 38a and 38b may be completely removed from the remainder of the container 30.

Following disengagement of the front and rear panels 38a and 38b from the remainder of the container 30, the left and right side panels 37a and 37b may then be disengaged from the base pallet 36 by sufficiently tilting the upper ends of the left and right side panels 37a and 37b outwardly, away from one another, in the manner discussed above, to move the holes 52 in the panels inwardly with respect to their respective base pallet pins 50 and effect removal of each of the side panel holes 52 of the base pallet 36 from their respective pins 50 of the base pallet. The side panels 37a and 37b may then completely separated from the base pallet 36.

With the panels 37a-b and 38a-b all disengaged from the base pallet 36 and one another, the panels may be stacked or nested as shown in FIG. 3, though, manifestly, various other nesting and stacking arrangements may be employed as well. An important consideration to be taken into account in designing containers 30 in accordance with the present invention is that, in order to nest the end panels 38a and 38b as well as the side panels 37a and 37b within the enclosure 165 formed by bringing together the cover 140 and base pallet 36, the distance between the opposing inner surfaces of peripheral skirt portions 40a and 40b, and the distance between the opposing inner surfaces of peripheral skirt portions 40c and 40d, must be greater than the distance between opposite sides 138 of the end panels 38a and 38b. Also, the height of the side and end panels 37a-b and 38a-b must be less than the distance between opposing inner surfaces of peripheral skirt portions 40c and 40d in order for the end and side panels to fit within the enclosure 165.

In forming the enclosure 165, pins 58 extending upwardly from peripheral skirt portions 40c and 40d of the base 36 are receivable in holes 145 formed in the peripheral skirt 142 of the cover 140 to provide alignment of the cover 140 with the base pallet 36 and prevent inward bulging and warpage of the side panels 37a and 37b. The pins 58 further serve to prevent inward bulging and warpage of the side panels 37a and 37b. The pins 58 engage respective side panels 37a and 37b near the midspan of the side panels so as to prevent the middle portion of the side panels from moving inwardly when acted upon by a pushing force pushing on the side panels 37a and 37b. The engagement of the pins 58 with their respective side panels 37a and 37b also prevents the middle portion of the side panels from bowing inwardly due to warpage, thus helping to minimize warpage of the side panels 37a and 37b. The side panels 37a and 37b may also be reinforced with horizontally extending members to further reduce warpage.

In the stacking arrangement of FIG. 3, either the front panel 38a or the rear panel 38b is first placed onto the base pallet 36 with its retaining panels 110 upward. In the illustrated embodiment, the front panel 38a is placed onto the base pallet 36 and fits between the pins 50 of the front and rear peripheral skirt portions 40a and 40b of the base pallet 36. The rear panel 38b is then placed on top of the front panel 38a, as shown in FIG. 3. Accordingly, with the base pallet 36 and front and rear panels 38a and 38b proportioned as shown in FIG. 3, the front and rear panels 38a and 38b are snugly secured between the front and rear peripheral skirt portions 40a and 40b, whereby the panels 38a and 38b are substantially prevented from sliding during shipping of the collapsed container. While the stacking arrangement discussed above was with reference to placement of the front panel 38a onto the base pallet 36 first, the rear panel 38b may be placed onto the base pallet 36 first, without departing from the invention.

The left and right side panels 37a and 37b are then placed on top of the stacked front and rear panels 38. With continued reference to the stacking arrangement of FIG. 3, the left side panel 37a is placed with its planar side member 62 downward, and resting on the retaining panels 110 of the rear panel 38b. The right side panel 37b is then placed, with its planar side member 62 facing downward, down onto the left side panel 37a.

With the panels 38a-d stacked in the aforementioned manner, they may be accommodated within the internal cavity defined upon bringing the cover 140 down onto the base pallet 36. As seen in FIG. 3, with the cover 140 placed onto the base pallet 36 following stacking of the panels 37a-b and 38a-b thereupon, there is clearance between the central support members 66 of the right side panel 37b and the central planar portion 141 of the cover 140. Thus, the container 30 may be collapsed from the assembled configuration of FIG. 1 into the collapsed arrangement of FIGS. 2 and 3.

The significant volume reduction realized upon collapsing the container 30 from its fully assembled configuration, shown in FIG. 1, to its collapsed configuration, shown in FIG. 2, is readily apparent in the following illustrative example. Given a container 30 having panels 37a-b and 38a-b that are four feet high, a base pallet 36 having eight foot length and four foot width, with cover and base pallet peripheral skirts 142 and 40 both having 0.5 foot extensions, the overall volume occupied by the container 30 when it is fully assembled (as in FIG. 1) is 128 cubic feet. When the container 30 is collapsed and the cover 140 and base pallet 36 are brought together (as in FIG. 2), the overall volume occupied by the container is 32 cubic feet. Hence, with this particular example, 96 cubic feet of storage space is saved when transporting the container 30 in its collapsed state as compared with the space required to transport the container in its fully assembled stated, as traditionally practiced. This example is illustrative only, and is not intended to be limiting in any way, as it is appreciated that still greater volume reductions are attainable with containers having different dimensions.

It is appreciated that various modifications and variations of the container designs disclosed herein could be made without departing from the inventive concepts. For instance, it may be desirable to eliminate the pins 50 extending inwardly from the front and rear peripheral skirt portions 40a and 40b, and eliminate the corresponding holes 52 in the end panels 38a and 38b, to save in production costs. This may be desirable in applications wherein the pin-in-hole engagements between the side panels 37a and 37b and the base pallet 36 are sufficiently strong to hold both the side and end panels to the base pallet. That is, the end panels 38a and 38b are engaged to the side panels 37a and 37b by bolts 130 or the like, with the side panels 37a and 37b being, in turn, engaged to the base pallet 36. Accordingly, both the side and end panels are engaged to the base pallet 36 through the engagement of the pins 50 within respective holes 52. That is, in this arrangement, the side panels 37a and 37b are engaged directly to the base pallet 36 and the end panels 38a and 38b are engaged to the base pallet through the side panels.

In a particular alternative embodiment of the invention, shown in FIGS. 12-19, an open top container 31 is provided which is essentially the same as the fully enclosed container 30 described above, except that the cover 140 of the previously-described container 30 is replaced by a flat cover 140'. This open top container 31 is intended primarily for use in such applications as storing stampings, scrap metal, manufactured components, or other materials for movement of the items between various locations within a factory, or for interfactory shipments. In this embodiment, pins 150' extending upwardly from each of the respective panels 37a-b and 38a-b are received within slots 171' extending inwardly from the ends of the flat cover 140' when the flat cover 140' is placed onto the container, to hold the cover 140' in place.

In accordance with another aspect of the present invention, permanently attached levers 170 or other suitable fastening components, may be used to maintain engagement between the end panels 38a and 38b and the side panels 37a and 37b, rather than using bolts 130 to secure engagement between the panels as described in the above embodiments. The levers 170 are shown and described herein with regard to their utilization in conjunction with the open top container 31, but it will be apparent that the levers 170 are equally well suited for usage with any of the embodiments falling within the scope of the invention, such as the fully enclosed container 30 described in detail above, and the ramp-modified fully enclosed container 34 described below.

Figure 15:
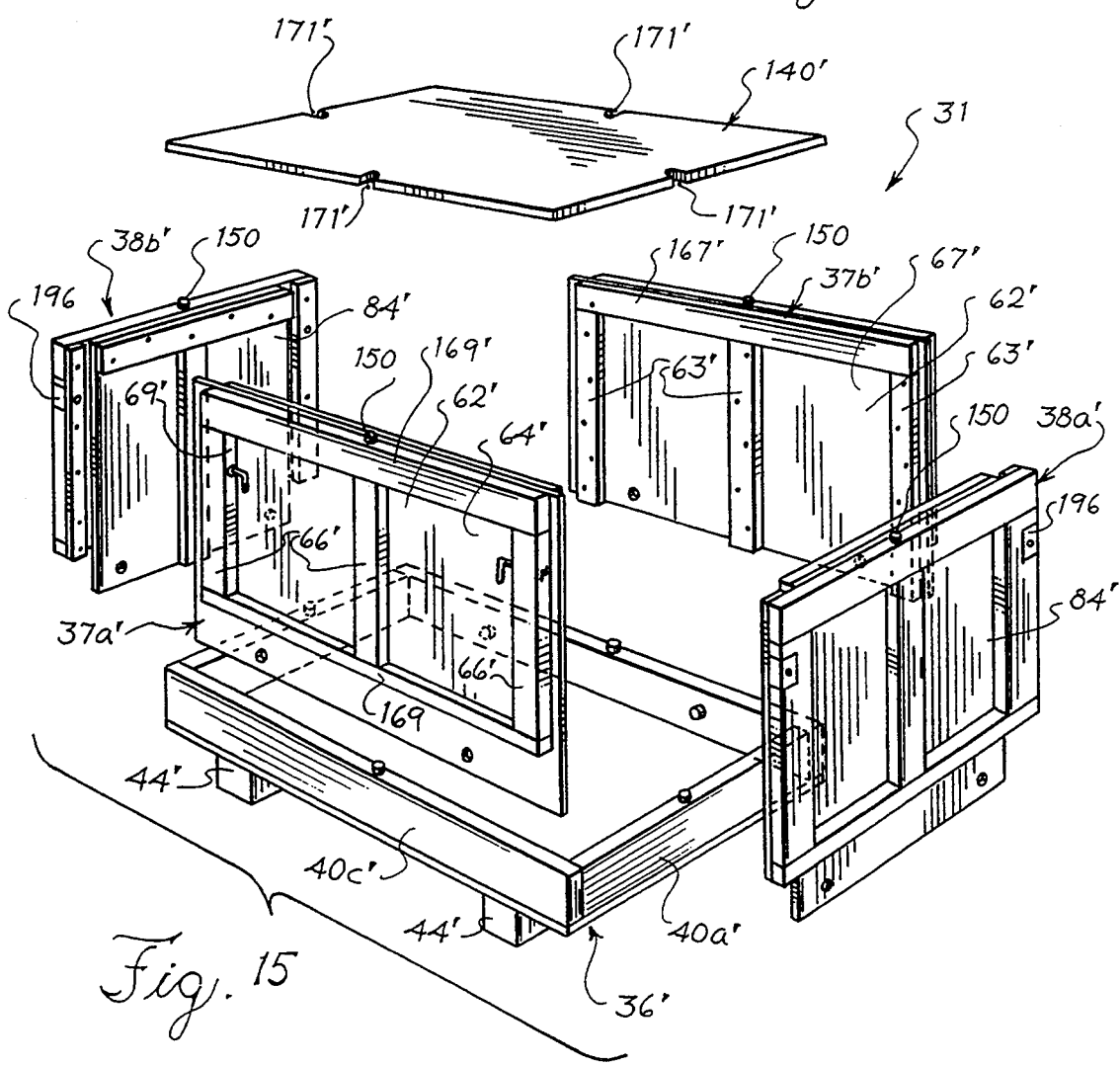
FIG. 15 is an exploded view of the container of FIG. 12.
Figure 16:
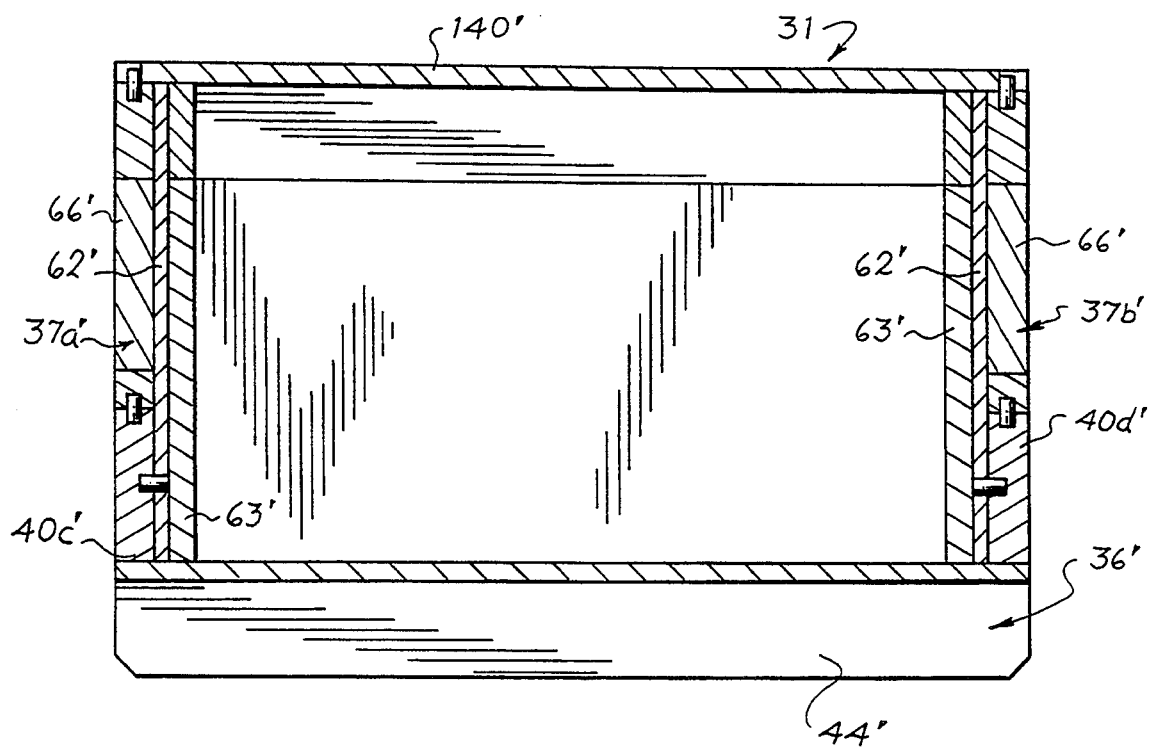
FIG. 16 is an enlarged, sectional view of the container, taken along line 16—16 of FIG. 12.

The levers 170 allow for rapid and simple manual fastening together of the front and rear end panels 38a' and 38b' to the left and right side panels 37a' and 37b' during assembly of the container 31. The levers 170 also allow for rapid and simple manual disengaging of the front and rear end panels 38a' and 38b' from the left and right side panels 37a' and 37b' upon disassembly of the container 31. A pair of levers 170, such as those shown in FIGS. 18 and 19, are permanently attached to both the left and right side panels 37a' and 37b' so that no extraneous parts are required to fully assemble the container 31 of this alternative embodiment. The alternative embodiment container 31 comprises front and rear end panels 38a' and 38b', left and right side panels 37a' and 367b', and base pallet 36'. The general configuration of the front and rear end panels 38a' and 38b' and the base pallet 36' is the same as panels 38a and 38b and base pallet 36 discussed above. In this alternative embodiment, however, the left and right panels 37a' and 37b' are modified to incorporate permanently affixed levers 170 on either end thereof, as seen in FIG. 15. The levers 170 permanently matingly engage with respective front and rear panels 38a' and 38b'.

To accommodate the levers 170, and to provide structural support to the planar members 62, the left and right side panels 37a' and 37b' of the container 31 of the alternative embodiment each include three support members 66' affixed vertically and parallel to one another on the outer side 64' of the planar side member 62', similar to the three support members 66 on the outer side 64 of the planar side member 62. Further structural support is provided by three vertically extending support members 63' affixed to the left and right side panels 37a' and 37b' on the inner side 67' of their planar side members 62'.

To provide additional structural support to the planar side members 62' of the left and right side panels 37a' and 37b', the side panels also include outer bracing planks 169 on the outer surface 64' of their planar side members 62' which respectively extend horizontally along the upper and lower ends of the planar side members 62', perpendicular to the three vertically extending support members 66'. The left and right side panels also both include an inner bracing plane 167' extending horizontally across the upper end of the inner planar side member surface 67', perpendicular to each of the three vertically extending support members 63'. The bracing planks 167' and 169' provide an enlarged surface at the top of the container panels to facilitate stacking of two or more containers 31. The bracing planks 167' and 169' also prevent damage to the upper ends of the planar side members 62', such as from chipping or the like associated with stacking of two or more containers 31.

The levers 170 extend through respective outward-most support members 66' with the central support member 66' of each side panel 37a' and 37b' inward of the outermost support members 66' not having any levers.

What is referred to as a lever 170 herein preferably comprises a shaft 172 having a perpendicularly extending handle portion 174 at a proximal end 176 thereof for manual gripping, and a locking pin 178 extending through the shaft 172 near the distal end 180 thereof. As best seen in FIG. 19, the shaft portion 172 of the lever 170 is received in a horizontally extending passageway 173 formed in the outward support members 66' for rotational and axial sliding movement therein. The passageway 173 includes an enlarged portion 175 at the inner side 69' of the support member 66'.

Figure 17:
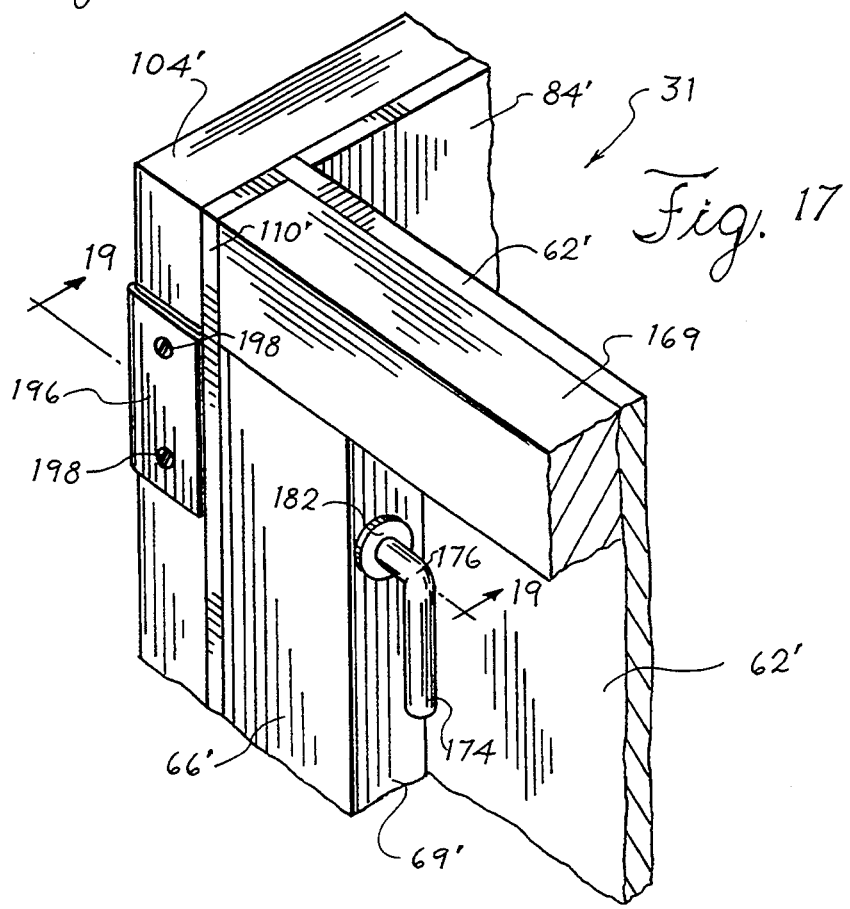
FIG. 17 is an enlarged, fragmented, perspective view of a locking mechanism at an upper corner portion of the container of FIG. 12.

The lever 170 is moveable between an engaging position in which the locking pin 178 is spaced from the support member 66', and an idle position in which the locking pin 178 is adjacent the support member 66'. When the levers 170 are in their engaging positions and connecting the respective panels, as shown in FIG. 17, the levers lie substantially flush against their respective side panels 37a and 37b, which prevents damage to the handles during shipping or the like.

The shaft 172 of the handle 170 is biased toward the inner side 69' of the support members 66', and thus toward its idle position, by a spring 180. The spring 180 is slidable along the shaft 172 of the lever 170 and is retained in the enlarged portion 175 of the passageway 173 between the integral flange 182 of the shaft 172 and the annular surface 190 which defines the inner extent of the enlarged passageway portion 175.

When the lever 170 is in its idle position, the flange 182 is spaced from the inner surface 69' of the support member 66' and the locking pin 178 is adjacent the support member 66'. The shaft 172 is slidable to its engaging position by manually gripping the handle portion 174 of the lever 170 and pushing it toward the support member 66'. By exerting sufficient force on the handle 174 to overcome the biasing force of the spring 180, the shaft 172 is slidable axially to its engaging position, with the flange 182 flush against the inner surface 69' of the support member 66'.

When the left and right side panels 37a' and 37b' are slidably engaged with the front and rear end panels 38a' and 38b', in the manner discussed above for panels 38a–d, inward sliding of the respective lever shafts 172 by pushing on the respective lever handle 174 moves the locking pin 178 into the respective front and rear end panels 38a' or 38b'.

The front and rear end panels 38a' and 38b' have respective pin-receiving slots into which the shafts 172 and locking pins 178 are received when the lever 170 is moved to its engaging position.

The configuration of the slots is best seen in the exploded view of FIG. 18. The supporting panel 104' has a recessed portion 194 forced therein which accommodates a metal U-shaped bracket 196 slid over the outer end 107' of the supporting panel 104'. The bracket 196 is secured to the supporting panel 104' by a pair of screws 198 extending through respective apertures 200 in the bracket. The bracket 196 includes an elongated opening 202 therein, which includes a central circular portion having elongations thereabove and therebelow, with the opening 202 extending substantially vertically. Hence, the locking pin 178 will pass through the opening 202 when oriented vertically, but will not pass through the opening 202 when oriented horizontally, since the locking pin 178 will abut the bracket 196 when oriented in this manner, as indicated by skeletal lines in FIG. 18.

The supporting panel 104' further includes a countersunk portion 204 which is recessed into the support member 104' still further from the recessed portion 194. Hence, when the bracket 196 is secured in place and accommodated within the recessed portion 194, the bracket 196 substantially covers the countersunk portion 204, with the bracket opening 202 being in alignment with the countersunk portion 204.

The retaining panels 110', which extend vertically along the front and rear end panels 38a' and 38b' at their lateral sides, also include a vertically elongated aperture 206 therein. The aperture 206 in the retaining panels 110' aligns with the opening 202 of the bracket 196 and the countersunk portion 204 of the support member 104.

Accordingly, when the support member 66' is placed flush against the retaining panel 110', the shaft 172 of the lever 170 is in registration with the aperture 206 and opening 202. Widen the handle portion 174 of the lever 170 is turned to orient the locking pin 178 vertically, and then pushed in the direction of the retaining panel 110', the locating pin 178 is slid through the aperture 206 in the retaining panel 110', through the opening 202 in the bracket 196, and received in the countersunk portion 204.

By maintaining the inward pressure on the handle 174 and simultaneously rotating the handle 174 to move the locking pin 178 to a horizontal orientation, and subsequently releasing the handle 174, the spring 180 moves the shaft 172 back outwardly. Thus, the biasing force of the spring 180 moves the locking pin 178 into abutment with the inner surface 210 of the bracket 196. The bracket 196 thus prevents the locking pin 178 from moving back out through the aperture 206. Hence, the locking pin 178 remain within the countersink portion 204, bearing against the bracket 196, to maintain secure engagement between the left and right side panels 37a' and 37b' and the front and rear end panels 38a' and 38b'. As best seen in FIG. 18, the rear side 210 of the bracket 196 has a horizontally extending groove 211 which extends horizontally outward from either side of the aperture 192. When the pin 178 is in its horizontal, engaged position, the biasing force of the spring 180 moves the pin 180 into the groove 211, whereby the pin 178 resides within the groove 211 which prevents the pin 178 from inadvertently rotating.

It should now be readily apparent that the levers 170 allow for simple and rapid container assembly and disassembly. During assembly of the container 31, after each of the panels 37a'–37b' and 38a'–38b' have been engaged with the base pallet 36', the aforementioned simple and manual manipulation of the levers 170 of the left and right side panels 37a' and 37b' securely engages the upper ends of each of the adjacent panels to prevent significant tilting of the panels.

As discussed above, in the container 31 of this alternative embodiment, the levers 170 replace the bolts 130 used in the preferred embodiment container 30. The levers 170 allow for the complete manual assembly of the container 31 without the use of additional tools. The configuration of the lever 170 and the openings in the front and rear panels 38a' and 38b' discussed above and illustrated in the accompanying drawings, allows the container 31 to be assembled easily and rapidly without the requirement of tools or other extraneous parts which may be misplaced or otherwise unavailable. This handle arrangement is, manifestly, variable in any of a number of ways, and the invention is not limited to the specific handle design shown and described herein.

The handle 174 and locking pin 178 integral with the shaft 172 extend from the shaft 172 perpendicularly to one another. Hence, during the initial container assembly, when the locking pin 178 is oriented vertically, the handle 174 extends horizontally, and thus extends perpendicularly outward from the planar side member 62' to facilitate easy gripping. After the handle 174 has been pushed inward to move the locking pin 178 through the opening 202, and then rotated to move the locking pin 178 to its horizontal orientation, the handle is then positioned vertically, adjacent the planar side member 62'. In this position, the handle 174 does not extend outward beyond the support member 66' and, hence, when the container 31 is fully assembled the handles do not interfere with stacking and other operations carried out with the container 31. This prevents the handles 174 from being inadvertently knocked to a horizontal position, which would result in disengagement of the left and right side panels 37a' and 37b' whose handle was rotated from the respective front and rear end panel 38a' or 38b'.

With the side panels 37a' and 37b' and end panels 38a' and 38b' of the container 31 fully assembled to one another and to the base pallet 36', and each of the levers 170 securely engaging the respective panels to one another, the container 31 is sturdy and capable of withstanding significant static and dynamic forces without becoming disassembled. In accordance with one aspect of the container 31 of the present invention, the container is capable of withstanding significantly greater force without disassembling than the amount of force required to effect disassembly at the desired time.

The container 31 may be easily manually disassembled at the desired time by simple manual manipulation of the levers 170. The handle 174 is first turned to rotate the locking pin 178 from its horizontal position to a vertical position. The biasing force of the spring 180 then slides the shaft 172 away from the retaining panel 110' and moves the locking pin 178 through the opening 202 in the bracket 196. Depending on the length of the spring and the depth and thickness of the various components, subsequent pulling on the handle 174 away from the support member 66' may be required to slide the vertically oriented locking pin 178 out through the opening 202 and the aperture 206. Movement of the locking pin 178 out past the aperture 206 disengages the respective side panel from the respective front or rear panel.

Following rotation and pulling of each of the levers 170 to disengage of each of the panels 37a'-37b' and 38a'-38b' from one another at their upper ends, the front and rear end panels 38a' and 38b' are tiltable outwardly to allow for subsequent disengagement from the base pallet 36'. As with disassembly of the container 30 of the preferred embodiment discussed above, the left and right side panels 37a' and 37b' may then be tilted and disengaged from the base pallet 36'.

Thus, the levers 170 allow for easy, rapid, manual engagement and disengagement of adjacent panels 37a'-37b' and 38a'-38b' at their upper ends to, respectively, prevent and allow tilting of the upper ends of the panels. The levers 170 remain attached to their respective left and right side panels 37a' and 37b', so that they will not become lost or unavailable.

In accordance with still another aspect of the present invention, one of the side or end panels may be used as a ramp. By way of example, in the alternative embodiment container 34 of the invention illustrated in FIGS. 20 and 21, the front panel 38a" is engageable with the base pallet 36" in a manner which allows the front panel 38a" to serve as a ramp. The ramp allows articles to be rolled onto and off of the base pallet 36". While the front panel 38a" is used as the ramp in FIGS. 20 and 21 to illustrate this aspect of the present invention, it is appreciated that any one or more of the panels may be engaged with any one or more of the base pallet skirt portions 40a"-40d".

The base pallet 36" of this alternative embodiment is essentially the same as the base pallets 36 and 36' discussed above. However, in this embodiment, the base pallet 36" includes a rectangular elevating support 230 which is spaced uniformly from each of the skirt portions 40a" to 40d" to define a rectangular channel 232 therebetween. As best seen in FIG. 21, the upper surface 234 of the elevating support 230 extends higher than the upper surface 236 defined by the peripheral skirts 40a"-40d".

In the illustrated embodiment, a pair of holes 52a" are formed in the upper surface 254 of the front peripheral skirt portion 40a". The upper end 90" of the planar member 84" of the front panel 38a" is placed on the ground and the holes 120a" at the lower end 102" of the planar member 84" are aligned with the holes 52a" in the front peripheral skirt portion 40a. The bolts 130 and/or 146 which will have been removed from their respective apertures to allow disassembly of the container 34 may be used to engage the front panel 38a" to the base pallet 36" by passing the bolts 130 and/or 146 through the respective aligned holes 120a" of the front panel 38a" and the holes 52a" in the base pallet 36", as shown in FIG. 21. With the front panel 38a" so engaged to the base pallet 36", articles, such as the wheel-mounted article 240, may be wheeled on the planar member 84" from the ground up onto the elevating support 230 of the base pallet 36".

After the wheel-mounted article 240 is rolled onto the base pallet 36", the bolts 130 and/or 146 may be removed from their respective apertures to allow easy detachment of the front end panel 38a" from the base pallet 36".

While the invention has been described with regard to its preferred embodiments, which constitute the best mode known to the inventor, it should be understood that various changes and modifications may be made, such as forming the container of wood, plywood, metal, plastics or other suitable materials or a combination thereof, without departing from the scope and spirit of the invention which is intended to be set forth in the claims appended hereto.

What is claimed is:

1. A collapsible, reusable container, comprising:
   a rectangular base having an upwardly extending peripheral skirt defining a pair of opposite end portions and a pair of opposite side portions, with each of said skirt portions having a respective upper and inner surface;
   said pair of opposite side portions both having one or more integral pins extending inwardly from their respective inner surfaces;
   said pair of opposite end portions both having one or more integral pins extending inwardly from their respective inner surfaces;
   a pair of end panels both having respective sides and respective lower ends, with one or more holes in said end panels in proximity with said lower ends, the holes corresponding in number and location to the pins extending inwardly from the end skirt portions, whereby each of the pins extending from the side skirt portions is receivable in a respective hole in the end panels to detachably engage the end panels to respective end portions of the skirt,
   a pair of side panels both having respective sides and respective lower ends, with one or more holes in said side panels in proximity with said lower ends, the holes corresponding in number and location to the pins extending inwardly from the side skirt portions, whereby each of the pins extending from the side skirt portions is receivable in a respective hole in the side panels to detachably engage the side panels to respective side portions of the skirt, with the side panels being positioned between the pair of end panels; and
   said end panels having integral side panel engaging means adjacent the sides of the end panels for detachably engaging the sides of the side panels when each of said side and end panels are engaged to said respective skirt portions with the side panel engaging means having means for preventing said side panels from moving inwardly of their respective side skirt portions, and with the positioning of the side panels between the end panels preventing inward movement of the end panels from their respective end skirt portions, whereby each of the side and end panels are manually detachably engageable with one another and to said base to form a container, with the side and end panels being manually detachable from the base to allow collapsing of said container.

2. A container in accordance with claim 1 wherein each of said side panels and end panels have an upper end and said container further includes a cover detachably engageable with the upper ends of each of the panels to close the open, upper end of the container.

3. A container in accordance with claim 2 wherein at least one of said side panels and said cover have means for engagingly receiving tamper-evident security seal means for preventing undetected removal of the cover.

4. A container in accordance with claim 2 wherein said cover has a downwardly depending peripheral skirt with means for engaging with said peripheral skirt of the base, whereby the base and the cover define an enclosure when their respective peripheral skirt portions are engaged.

5. A container in accordance with claim 4 wherein said side and end panels are proportioned in relation to the enclosure defined by the base end cover so as to be storable within said enclosure defined by the cover and base following detachment of the side and end panels from the base.

6. A container in accordance with claim 1 wherein said side panel engaging means of the end panels comprise channels extending vertically adjacent the sides of the end panels, with the sides of the side panels being slidably receivable within respective channels of the end panels.

7. A container in accordance with claim 5 wherein the sides of the side panels are maintainable within their respective end panel channels by fastener means for fastening the side panels to the end panels.

8. A container in accordance with claim 7 wherein the fasteners comprise bolts extending through apertures in both said end and side panels.

9. A container in accordance with claim 6 wherein the fastener means comprises apertures in the end panels and levers permanently affixed to the side panels, said levers being moveable from a disengaged position in which a locking portion of the levers does not extend into the apertures of the end panels, and an engaged position in which the locking portion of the levers extend into respective apertures of the end panels and engage the end panels to maintain engagement of the side and end panels.

10. A collapsible, reusable container, comprising:
a rectangular base having an upwardly extending peripheral skirt defining a pair of opposite end portions and a pair of opposite side portions, with each of said skirt portions having a respective upper and inner surface;
said pair of opposite side portions both having one or more pins extending inwardly from their respective inner surfaces;
said pair of opposite end portions both having one or more pins extending inwardly from their respective inner surfaces;
a pair of side panels both having respective sides and respective lower ends, with one or more holes in said side panels in proximity with said lower ends, the holes corresponding in number and location to the pins extending inwardly from the side skirt portions, whereby each of the pins extending from the side skirt portions is receivable in a respective hole in the side panels to detachably engage the side panels to respective side segments of the skirt, with the lower ends of the side panels being disposed between the opposite pair of end skirt segments;
a pair of end panels both having respective sides and respective lower ends, with one or more holes in said end panels in proximity with said lower ends, the holes corresponding in number and location to the pins extending inwardly from the end skirt portions, whereby each of the pins extending from the side skirt portions is receivable in a respective hole in the end panels to detachably engage the end panels to respective end segments of the skirt, with the lower ends of the end panels being disposed between the opposite pair of side skirt segments;
said end panels having side panel engaging means adjacent the sides of the end panels for detachably engaging the sides of the side panels when each of said side and end panels are engaged to said respective skirt portions to prevent said side panels from moving inwardly of, and becoming disengaged from, their respective side skirt portions, with the end panels bearing against the sides of the side panels to prevent inward movement of the end panels from, and disengagement from, their respective end skirt portions, whereby each of the side and end panels are detachably engageable with one another and to said base to form a container, with the side and end panels being detachable from the base to allow collapsing of said container; and
said pair of opposite side portions of the base skirt both also having one or more pins extending upwardly from their respective upper surfaces, and said side panels having one or more holes therein in proximity with their lower ends corresponding to the pins of the base skirt for receiving said upwardly extending pins, whereby the combination of upwardly and inwardly extending pins from the base skirt are detachably engageable with respective holes in the side panels upon movement of the side panels from an angled position to a vertical position to detachably engage the side panels to the base.

11. A container in accordance with claim 10, wherein said panel engaging means of the base comprises a plurality of pins, and wherein at least one of said panels has a lower end and said base engaging means of the panel comprises a hole arrangement in proximity with the lower end comprising a plurality of holes in the panels having a location and orientation corresponding to the location and orientation of said pins in the base, whereby the holes of the first pair of panels engagingly receive respective pins of the base when the panels are moved from said disengaged position to said engaged position.

12. A container in accordance with claim 10, wherein said panel engaging means of the base comprises at least one pair of pins extending mutually perpendicularly with respect to one another, and wherein at least one of said panels has a lower end and said base engaging means of the panel comprises a a pair of holes in the panels extending mutually perpendicularly with respect to one another in proximity with the lower end having a location and orientation corresponding to the location and orientation of said at least one pair of pins extending from the base, whereby the holes of the panels engagingly mate with respective pins of the base when the panels are moved from said disengaged position to said engaged position.

13. A container in accordance with claim 10 further including panel retaining means for retaining said panels in said substantially perpendicular position with respect to said base.

14. A container in accordance with claim 12 wherein said panel retaining means comprises panel engaging members for engaging adjacent panels to one another in proximity with their upper ends.

15. A container in accordance with claim 13 wherein said panel engaging members comprise levers disposed on each of a first pair of opposite panels, which levers have engaging portions which are each engagingly receivable in a respective one of a second pair of opposite panels.

16. A container in accordance with claim 10 wherein at least two of said panels have cover engaging means and said container further comprises a cover having panel engaging means for engaging with said cover engaging means of the panels to engage said cover with said panels in a substantially stationary position.

17. A container in accordance with claim 15 wherein said cover includes a peripheral skirt and said base includes a peripheral skirt, and said cover and base define an enclosure when said peripheral skirts of the cover and base are brought together.

18. A container in accordance with claim 16 wherein said panels are nestable with one another and proportioned in relation to said enclosure to be accommodatable within said enclosure when nested together to allow the disassembled container to be transported in a compact state of significantly lesser volume than the volume of the container in its fully assembled state.

19. A container in accordance with claim 10 wherein at least one of said panels has means for engagement with the base at a first end of said panel with the other end of said panel restable on the ground, whereby the panel serves as a ramp to facilitate movement of articles onto said base.

20. A collapsible, reusable container, comprising:
a rectangular base defining a first pair of opposite sides and a second pair of opposite sides;
said first pair of opposite sides having a pin arrangement in proximity therewith comprising a plurality of pins extending outwardly from the base, at least one of which extends perpendicularly to another pin of the pin arrangement;
said second pair of opposite sides having a pin-and-hole arrangement in proximity therewith comprising at least one pin extending outwardly from the base and at least one hole extending into the base perpendicular to said at least one pin;
a first pair of panels each having opposite sides and a lower end with a hole arrangement in proximity therewith comprising a plurality of holes in the panels having a location and orientation corresponding to the location and orientation of the pins in the first pair of sides of the base, whereby the holes of the first pair of panels engagingly receive respective pins of the first sides of the base upon movement of said first pair of panels from a disengaged position away from vertical with respect to the first sides of the base, to an engaged position substantially vertical with respect to the base;
a second pair of panels each having opposite sides and a lower end with a pin-and-hole arrangement in proximity therewith which is complementary to the pin-and-hole arrangement of the second sides of the base, whereby the pins of the second sides of the base are engagingly received in respective holes of the second pair of panels and the pins of the second pair of panels are engagingly received in respective holes in the second side of the base when said second pair of panels are moved from a disengaged position away from vertical with respect to the second side of the base to an engaged position substantially vertical with respect to the second side of the base.

21. A container in accordance with claim 19 further including a cover having means for engagement with the upper ends of one or more of said first and second pairs of panels.

22. A container in accordance with claim 20 wherein said base has a peripheral skirt and said cover has a peripheral skirt engageable with the peripheral skirt of the base, with cover and base defining an enclosure when engaged with one another.

23. A container in accordance with claim 21 wherein said first and second pairs of panels are nestable with one another and proportioned in relation to said enclosure so as to be accommodatable within said enclosure.

24. A container in accordance with claim 19 wherein said base has a peripheral skirt and said pins and holes extend, respectively, from and into said peripheral skirt of said base.

25. A container in accordance with claim 19 wherein said second pair of panels define integral channels adjacent their sides which engagingly receive respective sides of said first pair of panels.

* * * * *